United States Patent [19]

Demizu et al.

[11] Patent Number: 5,544,058

[45] Date of Patent: Aug. 6, 1996

[54] MISFIRE DETECTING APPARATUS FOR A MULTI-CYLINDER INTERNAL COMBUSTION ENGINE

[75] Inventors: Akira Demizu; Yukinobu Nishimura; Masakazu Sugai, all of Himeji, Japan

[73] Assignee: Mitsubishi Denki Kabushiki Kaisha, Tokyo, Japan

[21] Appl. No.: 138,057

[22] Filed: Oct. 19, 1993

[30] Foreign Application Priority Data

Oct. 20, 1992 [JP] Japan .................... 4-281590
Oct. 21, 1992 [JP] Japan .................... 4-283180
Oct. 21, 1992 [JP] Japan .................... 4-283181

[51] Int. Cl.⁶ .................... G06F 19/00; G01L 3/26
[52] U.S. Cl. .................... 364/431.05; 364/431.08; 73/117.3; 73/116; 73/112; 123/419; 123/436; 123/478
[58] Field of Search .................... 364/431.01–431.12, 364/550; 73/117.3, 116, 112, 119 A; 123/419, 436, 416, 417, 478, 357, 481, 425, 571; 60/227, 277

[56] References Cited

U.S. PATENT DOCUMENTS

| | | | |
|---|---|---|---|
| 4,040,294 | 8/1977 | Matsuda et al. | 73/117.3 |
| 4,445,483 | 5/1984 | Hasegawa | 123/492 |
| 5,016,593 | 5/1991 | Takaoka | 364/431.08 |
| 5,044,194 | 9/1991 | James et al. | 73/112 |
| 5,044,195 | 9/1991 | James et al. | 73/117.3 |
| 5,056,360 | 10/1991 | Dosdall et al. | 73/116 |
| 5,214,958 | 6/1993 | Inada et al. | 73/117.3 |
| 5,216,915 | 6/1993 | Sakamoto | 73/117.3 |
| 5,241,480 | 8/1993 | Takaku et al. | 364/431.08 |
| 5,245,866 | 9/1993 | Hashiguchi et al. | 73/117.3 |
| 5,251,138 | 10/1993 | Katayama | 364/426.04 |
| 5,263,364 | 11/1993 | Nakayama et al. | 73/116 |
| 5,278,760 | 1/1994 | Ribbens et al. | 364/431.07 |
| 5,287,737 | 2/1994 | Osawa et al. | 73/117.3 |
| 5,305,635 | 4/1994 | James et al. | 73/116 |
| 5,307,670 | 5/1994 | Imai et al. | 73/117.3 |
| 5,331,848 | 7/1994 | Nakagawa et al. | 73/116 |
| 5,337,240 | 8/1994 | Nakagawa et al. | 364/431.01 |
| 5,343,844 | 9/1994 | Fukui et al. | 123/481 |
| 5,359,882 | 11/1994 | Fukui | 73/117.3 |
| 5,379,634 | 1/1995 | Kuroda et al. | 73/116 |

*Primary Examiner*—Kevin J. Teska
*Assistant Examiner*—Jacques H. Louis-Jacques
*Attorney, Agent, or Firm*—Sughrue, Mion, Zinn, Macpeak & Seas

[57] ABSTRACT

A microcomputer-based misfire detecting apparatus for a multi-cylinder internal combustion engine. A crank angle sensor is coupled to the engine for detecting first and second predetermined angular intervals set before and after a predetermined reference crank position close to a TDC preceding to combustion stroke in each of the cylinders. An acceleration detector is connected to the output of the crank angle sensor for determining an acceleration based on a time ratio between times taken for a crank shaft to rotate through the first and second predetermined angular intervals, respectively, from the output signal of the crank angle sensor. A misfire occurrence detector is connected to the acceleration detector for detecting misfire occurring in the engine cylinder on the basis of the output signal of the acceleration detector.

35 Claims, 19 Drawing Sheets

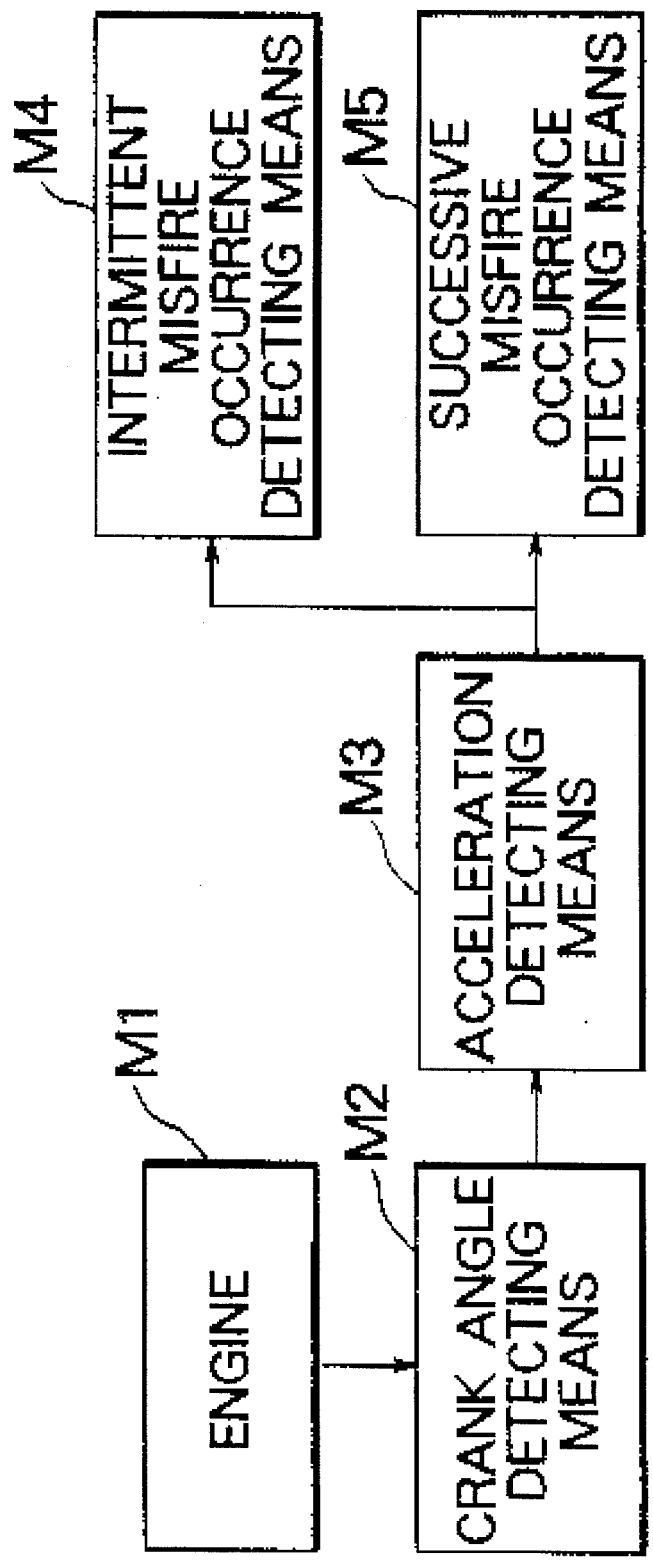

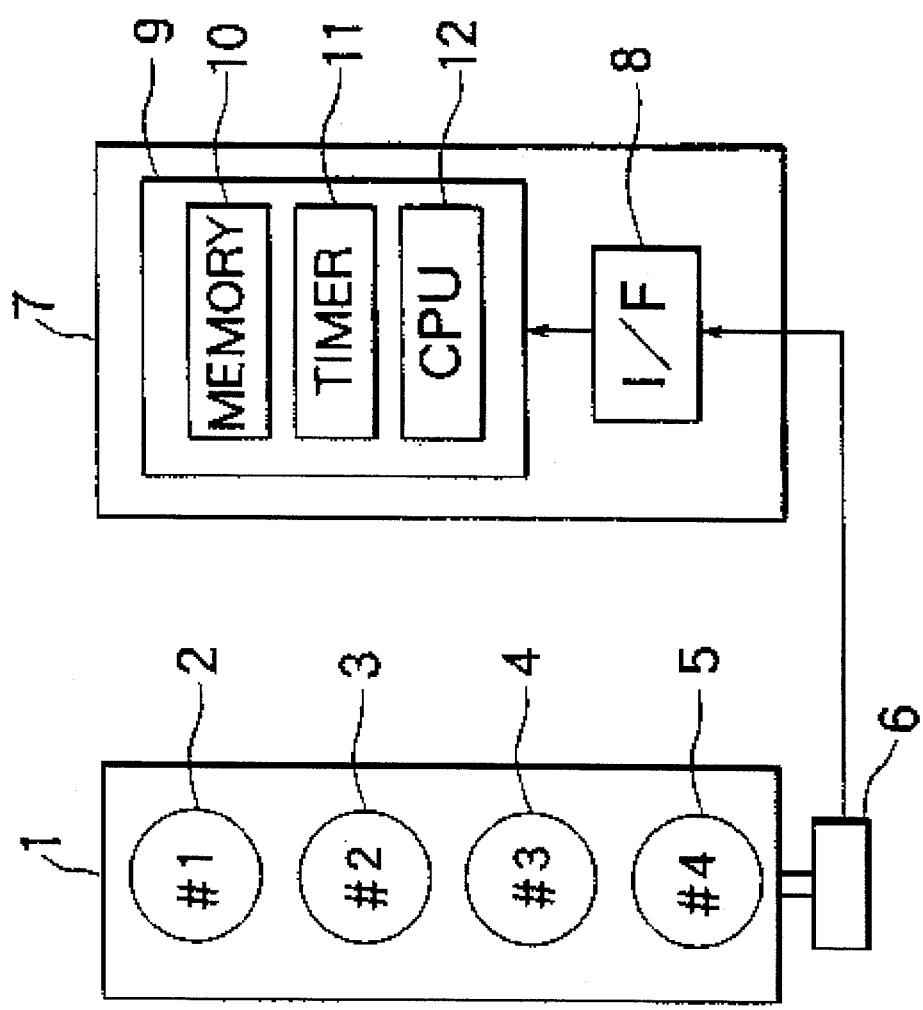

CRANK ANGLE (deg)

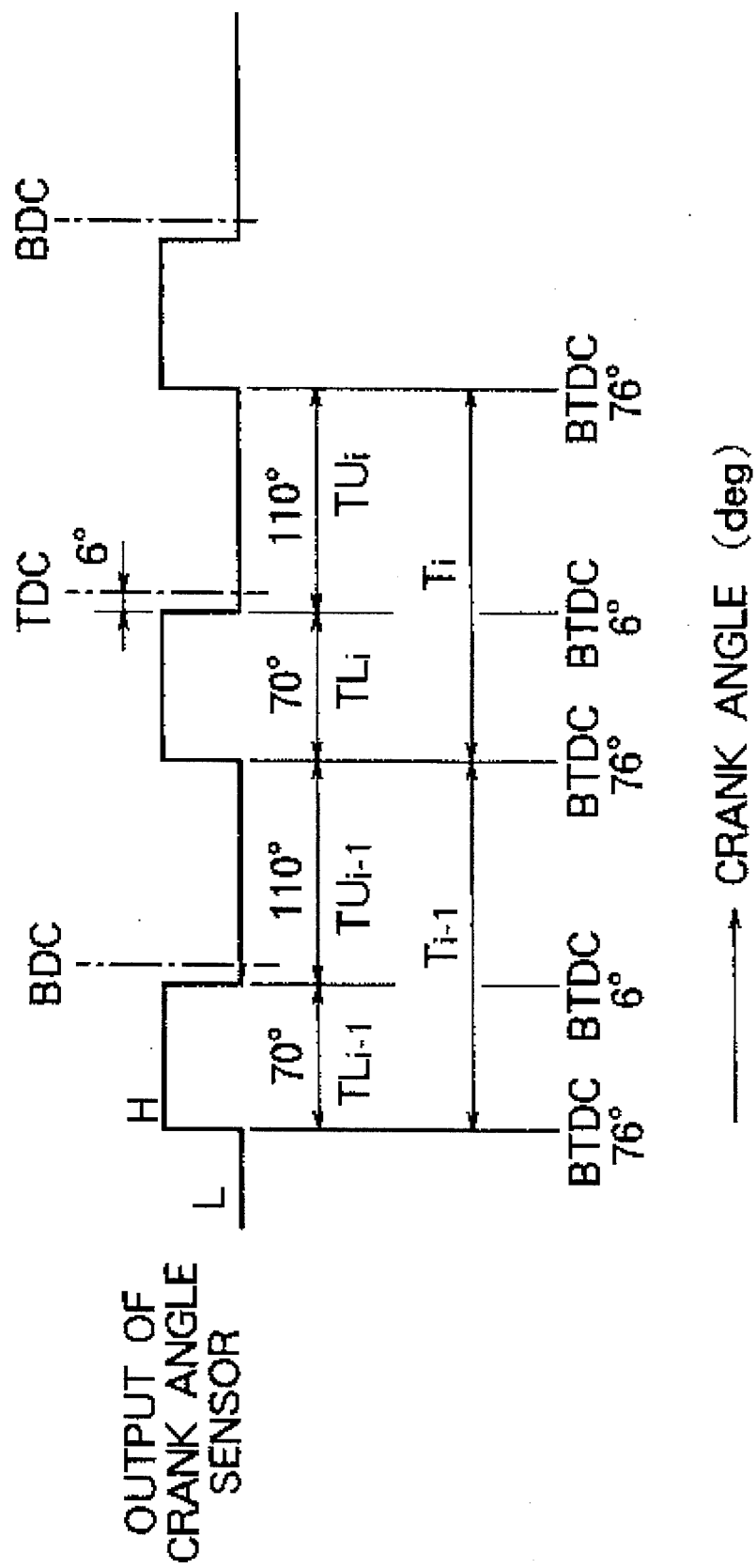

5,544,058

MISFIRE DETECTING APPARATUS FOR A MULTI-CYLINDER INTERNAL COMBUSTION ENGINE

BACKGROUND OF THE INVENTION

1. Field of the Invention

The present invention generally relates to a misfire detecting apparatus for an internal combustion engine. More specifically, the invention is concerned with a misfire detecting apparatus for detecting occurrence of misfire events or phenomenon in an internal combustion engine due to abnormality in the operation of an ignition or firing system, a fuel system and others.

2. Description of the Related Art

As a misfire detecting apparatus for the internal combustion engine (also referred to simply as the engine) known heretofore, there may be mentioned one which is disclosed, for example, in Japanese Unexamined Patent Application Publication No. 41400/1990 (JP-A-H2-41400). According to this known apparatus, a rotation speed (rpm) of the engine is monitored by using a crank angle sensor, wherein occurrence of misfire is determined on the basis of variation in the engine rotation speed (rpm) which is brought about by the misfire. More specifically, in the conventional misfire detecting apparatus, first and second predetermined angular intervals or ranges are, respectively, defined before and after a predetermined angular position of a crank shaft which serves as a reference position, wherein a ratio (time ratio) between the times taken for the crank shaft to rotate through the first and second intervals, respectively, is determined by a so-called time ratio detecting means on the basis of the output signal of the crank angle sensor. Subsequently, from the time ratio thus determined, acceleration (conceptually encompassing deceleration) is determined. By comparing the acceleration with a predetermined value which indicates occurrence of misfire event, decision is made as to whether or not misfire has taken place.

The misfire detecting apparatus known heretofore is however disadvantageous in that it lacks the capability of discriminating an intermittent occurrence of misfire and a successive or continuous occurrence thereof from each other. Consequently, when the situation under which the misfire occurs changes or when the rotation speed of the engine varies under the influence of vibration of a motor vehicle transmitted from the wheels in the course of running on a bad or rough road, there arises a possibility that erroneous misfire decision may be resulted. In reality, when the motor vehicle is driven on a rough road, the engine experiences significant variation in the rotation speed, which may lead to erroneous decision that the misfire takes place regardless of the absence thereof in actuality. Besides, the misfire decision is susceptible to adverse influence when the engine rotation speed and/or engine load changes. Under the circumstances, there exists a great demand for the misfire detecting apparatus for the internal combustion engine which can detect the occurrence of misfire without fail and thus ensure high reliability for the misfire detection.

SUMMARY OF THE INVENTION

In the light of the state of an art described above, it is a first object of the present invention to provide an improved misfire detecting apparatus which is capable of detecting the occurrence of misfire while identifying discriminatively whether it takes place intermittently or successively (continuously), to thereby enhance accuracy and reliability of the misfire detection.

A second object of the present invention is to provide a misfire detecting apparatus which is substantially immune to erroneous misfire decision brought about by other causes such as variation in the rotation speed (rpm) which the engine experiences when the motor vehicle is driven on a rough road such as a stone-paved road or the like.

A third object of the present invention is to provide a misfire detecting apparatus which can detect the occurrence of misfire phenomenon with enhanced reliability regardless of variations in the engine rotation speed and/or engine load.

In view of the first object mentioned above, there is provided according to a first aspect of the present invention a misfire detecting apparatus for a multi-cylinder internal combustion engine having a plurality of cylinders, which apparatus comprises a crank angle detecting means coupled to the engine for detecting first and second predetermined angular intervals set, respectively, before and after a predetermined reference crank angle for each of the individual cylinders, an acceleration detecting means connected to the output of the crank angle detecting means for determining as an acceleration a ratio between times taken for the engine to rotate through the first and second predetermined angular intervals, respectively, on the basis of an output signal of the crank angle detecting means, an intermittent misfire occurrence detecting means connected to the acceleration detecting means for detecting misfire occurring intermittently in the engine cylinder on the basis of the output signal of the acceleration detecting means, and a successive misfire occurrence detecting means for detecting misfire occurring successively or continuously in the engine cylinder on the basis of the output signal of the acceleration detecting means.

Further, for achieving the first and second objects, there is provided according to another aspect of the invention a misfire detecting apparatus for a multi-cylinder internal combustion engine having a plurality of cylinders, which apparatus comprises a crank angle detecting means coupled to the engine for detecting first and second predetermined angular intervals set, respectively, before and after a predetermined reference crank angle for each of the individual cylinders, an acceleration detecting means connected to the output of the crank angle detecting means for determining as an acceleration a ratio between times taken for the engine to rotate through the first and second predetermined angular intervals, respectively, on the basis of an output signal of the crank angle detecting means, an intermittent misfire occurrence detecting means connected to the acceleration detecting means for detecting misfire occurring intermittently in the engine cylinder on the basis of the output signal of the acceleration detecting means, and a successive misfire occurrence detecting means for detecting misfire occurring successively or continuously in the engine cylinder on the basis of the output signal of the acceleration detecting means, wherein a predetermined detection interval or period is provided for the intermittent misfire occurrence detecting means and the successive misfire occurrence detecting means, and decision is made that misfire has occurred when a misfire event which exceeds a predetermined misfire decision reference level is detected during the predetermined detection interval mentioned above.

With the misfire detecting apparatuses of the structures described above, the intermittent misfire occurrence detecting means detects the misfire occurring intermittently in the engine cylinder while the successive misfire occurrence detecting means detects successive occurrences of misfire on a cylinder-by-cylinder basis. By adopting algorithms optimal for the detection of the intermittent and successive misfire occurrences in these misfire detecting means, reliability of the misfire detection apparatus can be enhanced remarkably with the detection capability being correspondingly improved. Further, by determining the misfire occurrence ratio during a predetermined interval or period of the engine rotation, erroneous misfire detection due to other causes such as variation in the engine rotation speed brought about by vibration of a motor vehicle during running on a rough road can positively be prevented, whereby high accuracy and reliability can be ensured for the misfire detection.

The second object mentioned above can equally be achieved by providing according to a second aspect of the invention a misfire detecting apparatus for a multi-cylinder internal combustion engine having a plurality of cylinders, which apparatus comprises a crank angle detecting means coupled to the engine for detecting first and second predetermined angular intervals set, respectively, before and after a predetermined reference crank angle for each of the individual cylinders, an acceleration detecting means connected to the output of the crank angle detecting means for determining as an acceleration a ratio between times taken for the engine to rotate through the first and second predetermined angular intervals, respectively, on the basis of an output signal of the crank angle detecting means, an intermittent misfire occurrence detecting means connected to the acceleration detecting means for detecting misfire occurring intermittently in the engine cylinder on the basis of the output signal of the acceleration detecting means, and a successive misfire occurrence detecting means for detecting misfire occurring successively or continuously in the engine cylinder on the basis of the output signal of the acceleration detecting means, and a misfire decision means connected to the intermittent misfire occurrence detecting means and the successive misfire occurrence detecting means for counting misfire detection signals corresponding to the cylinders, respectively, which are detected, respectively, by the intermittent misfire occurrence detecting means and the successive misfire occurrence detecting means during respective predetermined detection intervals, to thereby determine intermittent occurrence of misfire or successive occurrence of misfire in the cylinder when the counted value exceeds a predetermined misfire decision reference value.

In a preferred mode for realizing the misfire detecting apparatus described just above, the misfire decision means may be so arranged as to invalidate the misfire decision during or in the detection interval where the counted values corresponding to a plurality of cylinders exceed a predetermined misfire decision value.

Owing to the structures of the misfire detecting apparatus described above, the misfire decision can positively be protected against misjudgment due to an abrupt change in the engine rotation speed as encountered in driving a motor vehicle on a bad road or due to a periodical change in the rotation speed experienced when driving the vehicle on a corrugated road.

Further, with a view to achieving the third object mentioned above, there is provided according to a third aspect of the invention a misfire detecting apparatus for a multi-cylinder internal combustion engine having a plurality of cylinders, which apparatus comprises a crank angle detecting means coupled to the engine for detecting first and second predetermined angular intervals, respectively, set before and after a predetermined reference angular position for each of the cylinders, a load detecting means coupled to the internal combustion engine for detecting a load of the engine, an acceleration detecting means connected to the crank angle detecting means for detecting as an acceleration a time ratio between the times taken for the engine to rotate through the first and second predetermined angular intervals, respectively, on the basis of the output signal of the crank angle detecting means, an engine rotation speed detecting means connected to the crank angle detecting means for detecting rotation speed (rpm) of the internal combustion engine on the basis of the output signal of the crank angle detecting means, an intermittent misfire occurrence detecting means connected to the load detecting means, the acceleration detecting means and the engine rotation speed detecting means for detecting intermittent misfire occurrence in each cylinder of the engine on the basis of the output signal of the acceleration detecting means, and a successive misfire occurrence detecting means connected to the load detecting means, the acceleration detecting means and the engine speed detecting means for detecting misfire occurring successively in each of the cylinders of the engine on the basis of the output signal of the acceleration detecting means, wherein the intermittent misfire occurrence detecting means and the successive misfire occurrence detecting means are adapted to change a misfire decision reference value in dependence on the output signal of the load detecting means.

In a preferred mode for implementing the misfire detecting apparatus described just above, the intermittent misfire occurrence detecting means and the successive misfire occurrence detecting means may be so designed as to change a misfire decision reference value in dependence on the output signal of the engine rotation speed detecting means.

In another preferred mode for realizing the misfire detecting apparatus described above, the intermittent misfire occurrence detecting-means and the successive misfire occurrence detecting means may be so designed as to invalidate misfire decision when the output signal of the load detecting means satisfies predetermined conditions or when the output signal of the engine rotation speed detecting means satisfies predetermined conditions.

With the structures of the misfire detecting apparatuses described above, the misfire detection reliability can further be enhanced by virtue of such arrangement that the misfire decision reference value is changed in dependence on the engine rotation speed (rpm) and/or the engine load so that the misfire decision is essentially insusceptible to the influence of the operation state of the engine. Besides, in an instable engine operation region where the misfire detection signal is of a small value, the misfire decision is invalidated so that error due to instability of engine operation is positively prevented from being involved in the misfire occurrence decision.

The above and other objects, features and attendant advantages of the present invention will more easily be understood by reading the following description of the preferred embodiments thereof taken, only by way of example, in conjunction with the drawings.

BRIEF DESCRIPTION OF THE DRAWINGS

FIG. 1 is a functional block diagram showing conceptually a structure of a misfire detecting apparatus for an internal combustion engine according to a first embodiment of the invention directed to the first aspect thereof;

FIG. 2 is a schematic diagram showing a hardwarewise configuration of the misfire detecting apparatus;

FIGS. 3(a), 3(b), 3(c) and 3(d) being depicted on a same scale of crank-angle abscissa;

FIG. 4 is a timing chart illustrating a waveform of an output signal of the crank angle sensor as a function of crank angle;

DESCRIPTION OF THE PREFERRED EMBODIMENTS

Figure 3A:
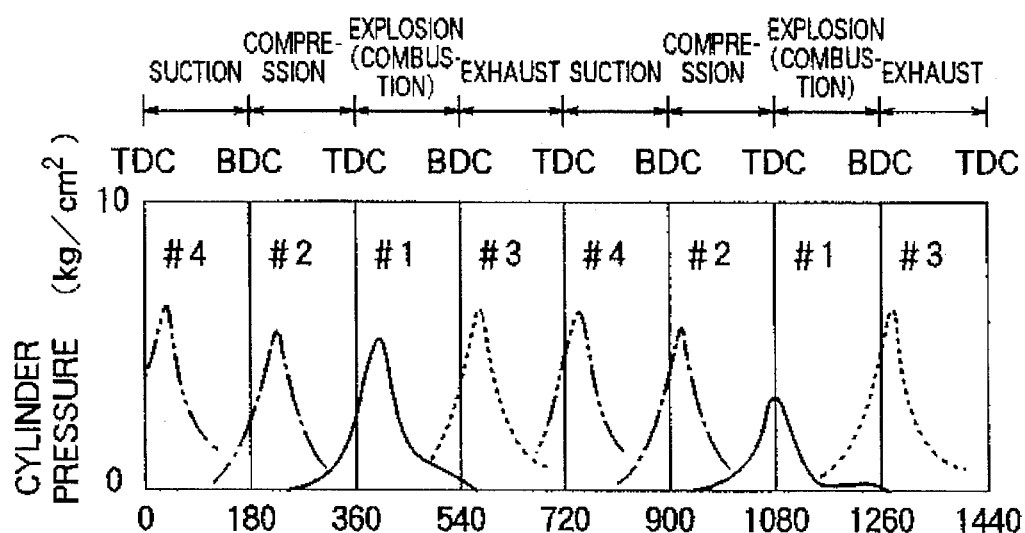
FIG. 3(a) is a waveform diagram for illustrating changes in pressure within cylinders of a four-stroke four-cylinder engine as a function of the crank angle.

Now, the present invention will be described in detail in conjunction with preferred or exemplary embodiments thereof by reference to the drawings.

Embodiment 1

FIG. 1 is a functional block diagram showing conceptually a structure of a misfire detecting apparatus for an internal combustion engine according to a first embodiment which corresponds to the first aspect of the invention.

Referring to the figure, an internal combustion engine (hereinafter referred to simply as the engine) M1 includes a plurality of cylinders. Coupled to the engine M1 is a crank angle detecting means M2 for detecting first and second predetermined angular intervals or ranges which precedes and succeeds, respectively, to a predetermined reference crank angle in each engine cylinder. An acceleration detecting means M3 which is connected to the output of the crank angle detecting means M2 is adapted to detect acceleration (conceptually covering deceleration) in the engine rotation speed (rpm) on the basis of a ratio (time duration ratio) between the times taken for a crank shaft or engine to rotate through the first and second predetermined angular intervals, respectively, before and after the reference crank angle position for each cylinder by processing the output signal of the crank angle detecting means M2.

Connected to the output of the acceleration detecting means M3 is an intermittent misfire occurrence detecting means M4 for detecting intermittent occurrence of misfire in each of the engine cylinders on the basis of the acceleration signal outputted from the acceleration detecting means M3. Additionally, there is connected to the output of the acceleration detecting means M3 a successive misfire occurrence detecting means M5 for detecting successive or continuous occurrence of misfire in the individual cylinder of the engine M1 on the basis of the acceleration signal supplied from the acceleration detecting means M3.

FIG. 2 is a schematic diagram showing a hardware configuration of the misfire detecting apparatus according to the instant embodiment. Referring to the figure, the engine denoted by a reference numeral 1 is shown as having four cylinders 2, 3, 4 and 5 (allotted with identification numbers #1, #2, #3 and #4, respectively). A crank angle sensor 6 provided in association with a crank shaft or a cam shaft of the engine 1 is adapted to output a periodical signal at reference crank angles (e.g., 180°) corresponding to the firing positions of the cylinders #1, ..., #4, respectively. The signal outputted from the crank angle sensor 6 is supplied to a misfire detecting unit 7 for detecting misfires taking place intermittently or successively in each of the cylinders of the engine 1 on the basis of the accelerations which are determined on the basis of the times taken for the crank shaft to rotate through the predetermined intervals for the engine cylinders #1, ..., #4, respectively.

The misfire detecting unit 7 includes an interface 8 for transmitting the output signal of the crank angle sensor 6 to a microcomputer mentioned below, a memory 10 for storing processing procedures or programs as well as control information or data and results of arithmetic operations or calculations described later on, a timer counter (free-running counter) 11 whose count value is incremented in response to clock pulses generated periodically at a constant interval, and a microcomputer 9 which incorporates a central processing unit or CPU 12 for executing misfire detection/decision processings, a work memory (not shown) and others. The output signal of the crank angle sensor 6 is inputted to the microcomputer 9 via the interface 8, whereby the misfire detection/decision processing is executed on the basis of the crank angle sensor signal.

Next, description will turn to operations of the engine and the misfire detecting apparatus according to the instant embodiment.

At first, a relation existing between the output signal of the crank angle sensor 6 and the firing combustion stroke will be considered.

FIG. 3(a) is a waveform diagram for illustrating changes in the pressure within the cylinders 2 to 5, respectively, of a four-stroke four-cylinder engine as a function of the crank angle.

In this figure, a solid-line curve shows a pressure waveform of the first cylinder #1 (cylinder 2) of the engine, wherein reference character BDC designates the bottom dead center with TDC designating the top dead center. As can be seen in the figure, in the four-cylinder engine, the combustion stroke of each of the individual cylinders takes place at every 180° of the crank angle. Parenthetically, in FIG. 3, only the pressure waveform of the first cylinder #1 is continuously shown throughout one cycle of suction, compression, explosion and exhaust strokes, while for the cylinders #2, #3 and #4, only the pressure waveforms in the compression and explosion (combustion) strokes are shown with those in the suction and discharge strokes being omitted from illustration.

Figure 3B:
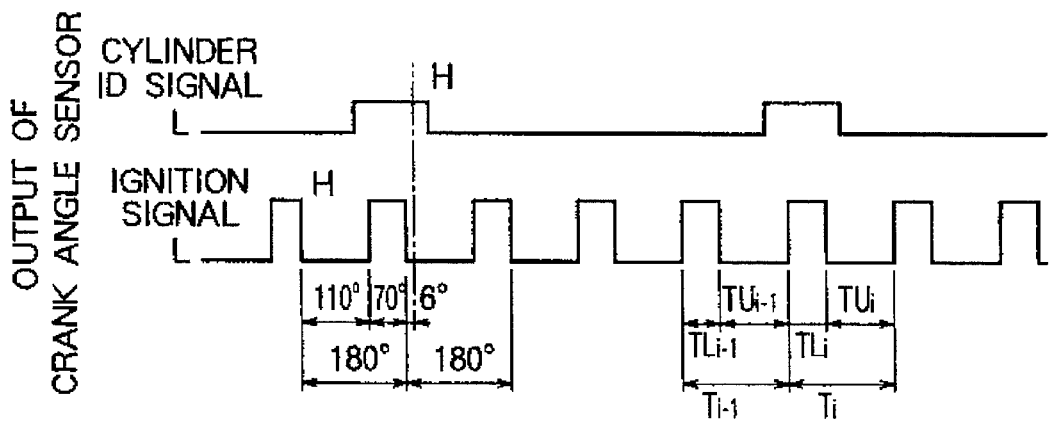
FIG. 3(b) shows waveforms of a cylinder identification signal and a periodical ignition signal, both signals being derived from the output of a crank angle sensor coupled to the engine.

FIG. 3(b) shows waveforms of a cylinder identification signal and a periodical ignition signal which are derived from the output of the crank angle sensor 6. As can be seen in this figure, derived from the output of the crank angle sensor 6 are an ignition signal having a period of 180° in terms of the crank angle (hereinafter represented by notation such as 180° CA) and generated With reference to a position preceding, for example, by 6° CA to the TDC, wherein the above-mentioned period is divided into a low-level interval (hereinafter referred to as the L-interval), for example, of 110° CA and a high-level interval (hereinafter referred to as the H-interval) of 70° CA. The cylinder identification signal for identifying the individual cylinders is generated at a timing corresponding to the H-interval of the ignition signal for the first cylinder #1.

In general, the ignition control is realized by controlling the electric energization of an ignition coil (not shown) on the basis of the cylinder identification signal. More specifically, let's consider the first cylinder #1, by way of example. The electrical energization of the ignition coil for the cylinder #1 is triggered during the H-interval in the compression stroke corresponding to the crank angle range from 180° to 360°, as can be seen from FIGS. 3(a) and 3(b). The electrical conduction of the , ignition coil is interrupted in response to the change in the output signal of the crank angle sensor 6 from the H-level to the L-level which occurs in the vicinity of the TDC at the ignition timing determined in dependence on the engine rotation speed (rpm). Upon interruption of the electric conduction through the ignition coil, a high voltage is generated across a secondary winging of the coil and applied to a spark plug (not shown). Thus, the fuel mixture is fired in the explosion or combustion stroke which extends from 360° CA to 540° CA, resulting in increasing of the cylinder pressure. In this manner, the combustion (explosion) stroke is repeated at every 180° CA in the ignition sequence for #1, #3, #4 and #2 in this order.

Next, description will be directed to an exemplary method of detecting the misfire phenomenon.

Figure 3C:
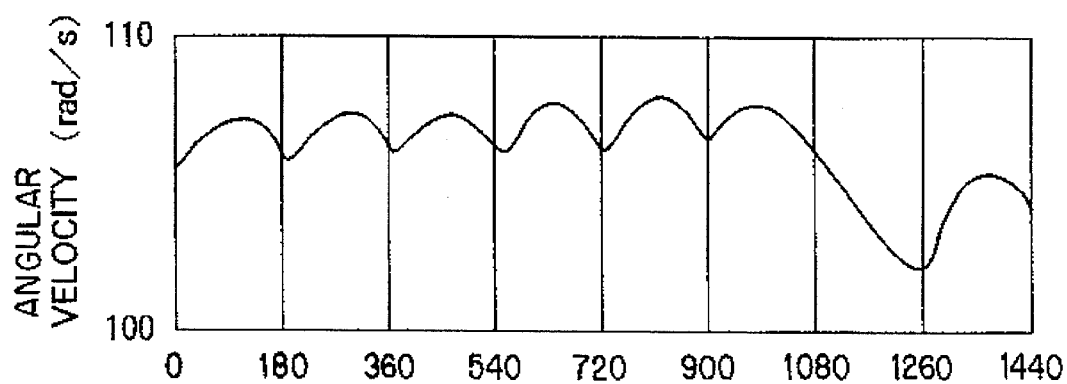
FIG. 3(c) illustrates in combination with FIG. 3(a) a relation between combustion strokes in the cylinders and an angular velocity.
Figure 3D:
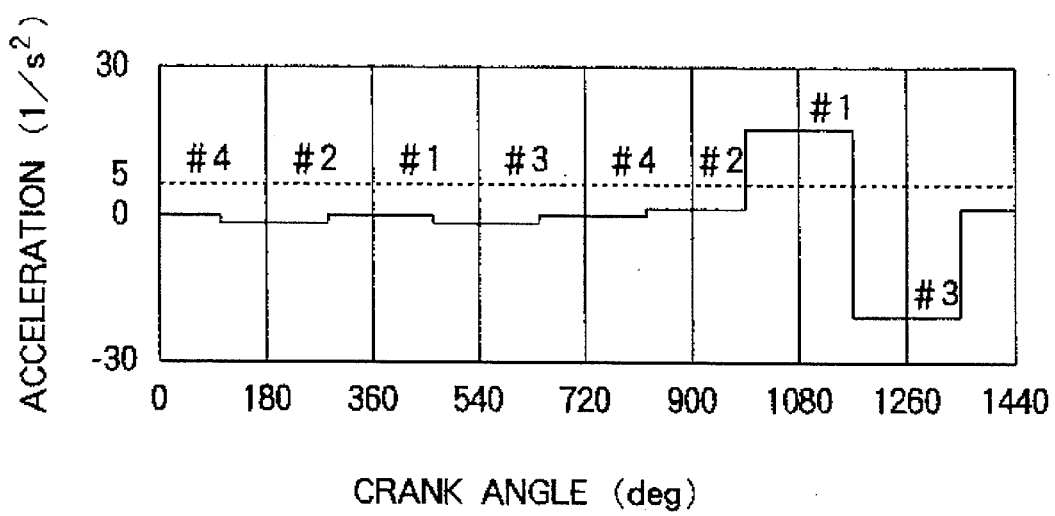
FIG. 3(d) is a diagram illustrating a relation between misfire and acceleration.

FIG. 3(c) illustrates in combination with FIG. 3(a) a relation between the combustion and the angular velocity the assumption that the engine rotation speed is 1000 rpm. In the first cylinder #1 whose cylinder pressure is shown by a solid-line curve in FIG. 1(a), the waveform thereof around the 360° CA represents a normal combustion, wherein the gas mixture charged in the suction stroke is pressurized in the compression stroke, fired in the vicinity of the TDC in the compression stroke, and expanded explosively in the explosion (combustion) stroke. The exhaust gas resulting from the explosive combustion is discharged from the cylinder.

The misfire phenomenon may take place due to ignition failure and/or improper mixing ratio of the air and the fuel. Such misfire is represented by a cylinder pressure waveform depicted for the first cylinder #1 around 1080° CA in FIG. 3(a). It will be noted that this waveform is symmetrical relative to the TDC. In this case, it is assumed that the combustion does not take place at all, i.e., complete misfire. However, when the misfire is only partial, the pressure change during the explosion stroke assumes a level between the normal combustion and the complete misfire, as represented by a waveform in a range of 360° to 540° CA in FIG. 3(a).

Further, as shown in FIG. 3(c), the angular velocity exhibits such a characteristic that it increases in correspondence to the increase in the torque due to the explosion in the cylinder while decreasing in the compression stroke.

Assuming that the misfire takes place at 1080° CA, engine output torque does not increase because of absence of the explosion, as a result of which the angular velocity continues to decrease up to the time point When the explosion takes place subsequently in the third cylinder #3. The present invention starts from this fact and proposes a means for deciding occurrence of the misfire on the basis of the change in the angular velocity over a predetermined range of crank angles as brought about by the absence of the combustion.

Now referring to FIG. 3(b), description will be made in what manner the angular velocity can actually be made use of in the misfire decision.

In FIG. 3(b), a symbol T represents an ignition period for each cylinder which is repeated every 180° CA, a symbol TU represents a temporal or time duration of the L-interval corresponding to 110° CA and TL represents a time duration of the H-interval corresponding to 70° CA. An affix i represents a value in the current period while (i−1) represents a value in the preceding period.

In a rotary or circular motion, an angular acceleration α (rad/sec²) is given by the following expression (1):

$$\alpha = (\omega_i - \omega_{i-1})/T_i \tag{1}$$

where $\omega_i$ represents an angular velocity during a period $T_i$ which periodically intervenes between successive ignitions.

On the other hand, the angular velocity $\omega_i$ (rad/sec) is given by $$\omega_i = 4\pi/c \times (1/T_i) \tag{2}$$

where c represents the number of the cylinders of the engine.

When polarities of the angular velocity $\omega_i$ and the angular acceleration α are selected such that the angular acceleration α assumes a positive value when the angular velocity $\omega_i$ decreases, the expressions (1) and (2) can be combined as follows:

$$\alpha = 4\pi/c \times (1/T_i) \times \{T_i/T_i^2 - (T_{i-1}/T_{i-1}^2)\} \tag{3}$$

Assuming that $T_{i-1}=T_i+\Delta T_i$, where $\Delta T_i^2 \ll 1$, the angular acceleration $\alpha$ given by the expression (3) can approximately be rewritten as follows:

$$\alpha = 4\pi/c \times (T_i - T_{i-1})/T_i^3 \tag{4}$$

Further, the relation between the inter-ignition period $T_i$ (i.e., the period intervening between the successive ignitions) and the time durations TU and TL is given by $$T_i = TL + TU$$

where the term TL represents information about the amount of air as charged in the compression stroke. Thus, the above expression means that the time duration TU is standardized with reference to the amount of charged air.

Assuming again that the amounts of the charged air in the adjacent cylinders are equal to each other, it applies valid that $$TL_i = TL_{i-1}$$

From the relation given by $\Delta T_i = T_{i-1} - T_i = TU_{i-1} = TU_i$, the angular acceleration $\alpha$ is given by the following expression:

$$\alpha = 4\pi/c \times TL_i/T_i^3 \times (TU_i/TL_i - TU_{i-1}/TL_{i-1}) \tag{5}$$

According to the teachings of the invention incarnated in the instant embodiment, the term $4\pi/c$ is deleted, wherein as an approximate expression of the angular acceleration, an acceleration $\beta$ given by the undermentioned expression (6) is utilized for detecting the occurrence of misfire in terms of a change in the angular velocity.

$$\beta = TL_i/(T_{i-1})^3 \times (TU_i/TL_i - TU_{i-1}/TL_{i-1}) \tag{6}$$

Figure 5:
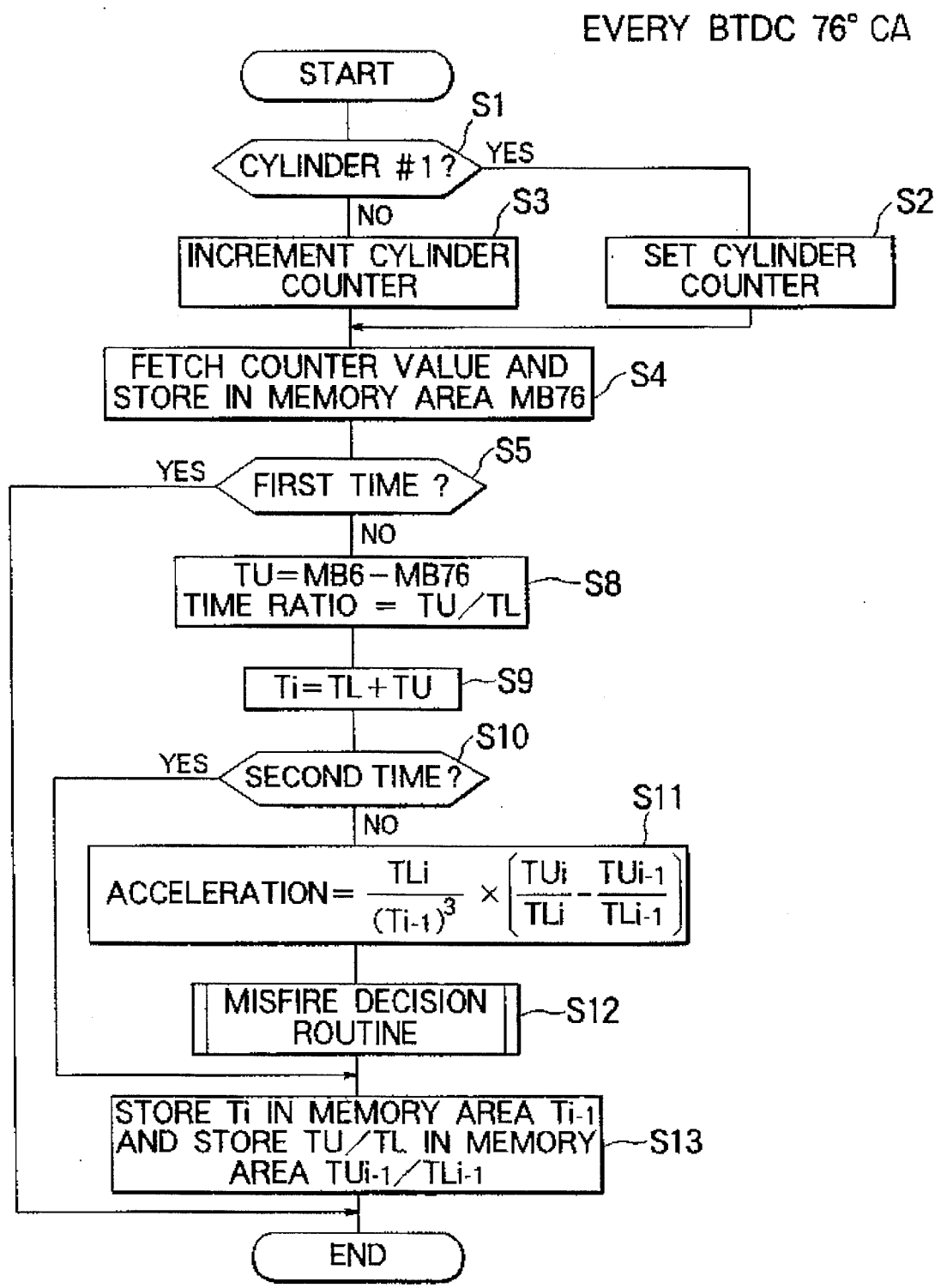
FIG. 5 is a flow chart for illustrating a misfire occurrence detection processing executed by the apparatus according to the first embodiment of the invention.
Figure 6:
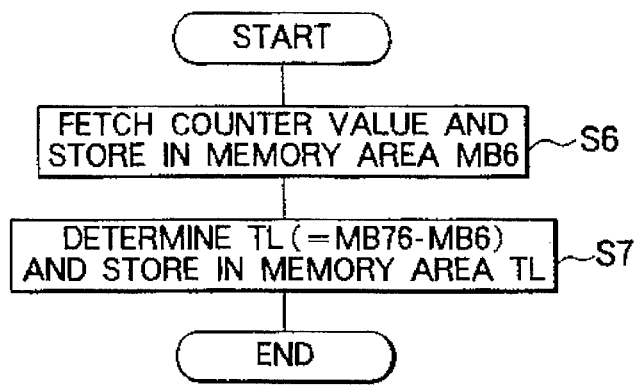
FIG. 6 is a flow chart for illustrating a routine included in the processing shown in FIG. 5.

FIG. 4 is a timing chart illustrating a waveform of the output signal of the crank angle sensor as a function of the crank angle, and FIGS. 5 and 6 are flow charts for illustrating processings executed by the microcomputer 9.

As mentioned previously, according to the teaching of the invention, the time or duration of the H-level interval TL covering for 70° CA from a position preceding by 6° CA to the top dead center TDC in the ignition signal derived from the output of the crank angle sensor 6 shown in FIG. 3(b) and the time or duration of the L-level interval TU covering 110° CA starting from the top dead center TDC are measured, whereon acceleration is arithmetically determined on the basis of the times or temporal durations of the H- and L-level intervals, which is then followed by determination or decision of occurrence of misfire on the basis of the acceleration thus determined.

Referring to FIG. 4, an interrupt is issued to the microcomputer 9 via the interface 8 in response to the ignition signal derived from the output of the crank angle sensor 6 at every position corresponding to 76° CA preceding to the top dead center TDC (hereinafter represented by BTDC 76° CA), whereby the processing illustrated in FIG. 5 is executed as an interrupt processing routine at every BTDC 76° CA, while the processing shown in FIG. 6 is executed at every BTDC 6° CA.

Now, referring to FIG. 5, the CPU 12 of the microcomputer 9 makes reference to the cylinder identification signal derived from the output of a crank angle sensor 6 shown in FIG. 3(b) to thereby determine to which of the cylinders the processing to be executed corresponds (step S1). The cylinder identification signal has the H-level interval at the timing corresponding to 720° CA of the periodical ignition signal for the first cylinder #1. Accordingly, when the cylinder identification signal fetched in the step S1 is at "H" level, the CPU 12 decides that the processing is to be executed for the first cylinder #1, which is then followed by a step S2 where a value representing the first cylinder #1 is set in a cylinder counter (not shown) secured in the memory 10 for storing the cylinder identification signal.

On the other hand, when the cylinder identification signal is at "L" level, the CPU 12 decides that the subject which is to undergo the processing is not the first cylinder #1, whereon a step S3 is executed to thereby increment the cylinder counter. In this manner, the value of the cylinder counter is updated at every BTDC 76° CA. The processing shown in FIG. 5 is executed on a cylinder-by-cylinder basis by referencing the count value contained in the cylinder counter.

Subsequently, the processing proceeds to a step S4 where the CPU 12 fetches the count value from the timer 11 which is incremented in response to every clock generated at a predetermined constant time interval, the count value being then stored in a memory address or area MB 76 (not shown) secured in the memory 10.

The stored value indicates the time at the BTDC 76° CA or corresponding thereto. Next, a step S5 is executed, where decision is made by referencing a flag (not shown) whether or not the current processing is the first time after the start of the program shown in FIG. 5. The flag mentioned above is so set as to indicate the first time of execution of the program upon start thereof. In this case, the flag is reset, and the processing comes to an end.

The CPU 12 assumes a standby state waiting for the ignition period signal derived from the output of the crank angle sensor 6 to indicate the BTDC 6° CA. When the angular position of BTDC 6° CA shown in FIG. 4 is attained as the engine rotates, the interrupt takes place again in response to the ignition signal derived from the output of the crank angle sensor 6, whereby the routine shown in FIG. 6 is executed. More specifically, in a step S6, the count value is fetched from the timer 11. This count value indicates the time at the angular position BTDC 6° CA and is stored in the memory area MB6 (not shown).

Subsequently, in a step S7, the time corresponding to the angular position BTDC 76° CA obtained in the step S4 shown in FIG. 5 is referenced to thereby determine the time duration of the interval $TL_{i-1}$ shown in FIG. 4 in accordance with the following expression:

$$TL = MB76 - MB6 \tag{7}$$

The time duration thus determined is then stored in a memory area TL (not shown), whereupon the processing shown in FIG. 6 comes to an end.

When the angular position BTDC 76° CA corresponding to the ignition for the succeeding cylinder is attained, the processing shown in FIG. 5 is again executed.

First, the steps S1 to S3 are executed to update the cylinder identification number. In the step S4, the value stored in the memory area MB 76 is updated in preparation for a succeeding processing. Since the initial flag is reset in the preceding processing, a step S8 is executed where the time corresponding to the angular position BTDC 6° CA obtained in the step S6 of FIG. 6 is referenced to thereby calculate the time duration of the interval $TU_{i-1}$ shown in FIG. 4 in accordance with:

$$TU = MB6 - MB76 \tag{8}$$

Next, the time duration ratio is calculated in accordance with:

$$\text{time duration ratio} = TU/TL \tag{9}$$

Nest, in a step S9, the duration time of the interval $T_{i-1}$ shown in FIG. 4 is determined on the basis of the value stored in the memory area TL and the value of the time duration TU calculated in the step S8 in accordance with $$T_i = TL + TU \tag{10}$$

In a step S10, decision is made as to whether the current execution of the processing shown in FIG. 5 is the second time after the start of the program by referencing a flag (not shown). This flag is so set as to indicate the second time upon starting of the program. In this case, the flag is reset, whereupon a step S13 is executed.

In the step S13, the value of $T_i$ determined currently in accordance with the expression (10) is stored in the memory area $T_{i-1}$ of the memory 10 where the value of $T_i$ determined precedingly is held. Similarly, the time ratio TU/TL determined currently in accordance with the expression (9) is stored in a memory area $TU_{i-1}/TL_{i-1}$ where the value of TU/TL determined precedingly is held. Then, the processing comes to an end.

When the angular position BTDC 6° CA located immediately before the top dead center TDC shown in FIG. 4 is attained as the engine rotates, the routine shown in FIG. 6 is executed, whereby the clock time at this instant is stored in the memory area MB 6, while the time duration of the interval $TL_i$ shown in FIG. 4 is calculated in accordance with the expression (7) mentioned hereinbefore, the result of which is then stored in the memory area TL.

Subsequently, when the crank shaft reaches the angular position of BTDC 76° CA at which the ignition signal for the succeeding cylinder is generated, the processing shown in FIG. 5 is again executed. Since the current execution is the third time, the clock time at the instant time point is stored in a memory area Mb 76 via the steps S1, S3, S4, S5, S8 and S9, whereupon the temporal durations of the intervals $TU_i$ and $T_i$ shown in FIG. 4 are calculated in accordance with the aforementioned expressions (8) and (10), respectively.

Next, in the step S10, the number of times the processing was executed is determined. Since the flag indicating the second processing has been cleared in the step S10 in the preceding processing, a step S11 is executed, where the acceleration is calculated in accordance with the expression (6) by using the aforementioned values stored in the memory.

Subsequently, a misfire decision routine is executed in a step S12. In this routine, the accelerations determined in the step S11 are stored sequentially in memory areas β#1, β#2, β#3, and β#4 by referencing the cylinder identifying numbers determined in the steps S1 to S3 in preparation for execution of the misfire decision.

Next, the processing proceeds to a step S13 where the current values of $T_i$ and TU/TL are stored in the memory areas $T_{i-1}$ and $TU_{i-1}/TL_{i-1}$, respectively, in preparation for the succeeding processings starting from the fourth processing, whereupon the current processing comes to an end.

In this manner, the processing shown in FIG. 5 is executed at the crank angle of BTDC 76° with the routine shown in FIG. 6 being executed at the crank angle of BTDC 6°, whereby accelerations for the individual cylinders, respectively, are sequentially calculated in the ignition timing order to thereby allow the misfire decision to be effected on a cylinder-by-cylinder basis.

FIG. 3($d$) is a diagram illustrating a relation between the misfire and the acceleration (1/sec$^2$). In the figure, solid line segments represent the accelerations calculated for the individual cylinders #1 to #4, respectively, while a broken line represents a reference value (e.g. 5/sec$^2$) for the misfire decision. As can be seen in this figure, the acceleration corresponding to the cylinder #1 increases beyond the reference level around the crank angle of 1080°. Thus, the occurrence of misfire can be decided on the basis of this change of the acceleration.

Description will now be made of methods for detecting intermittent and successive misfire phenomena, respectively.

Figure 7:
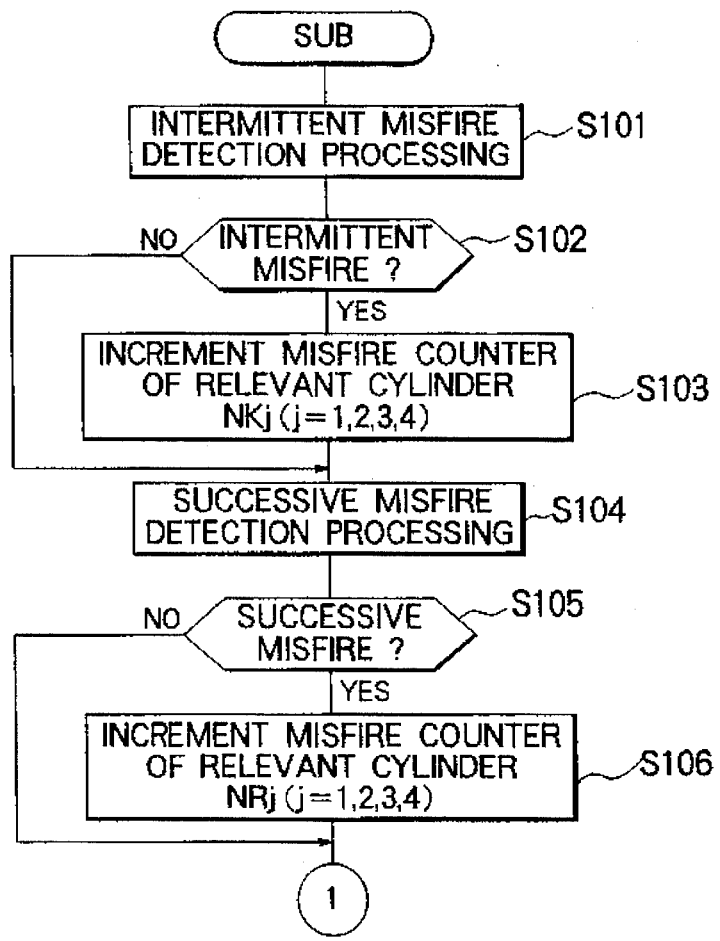
FIG. 7 is a flow chart illustrating an intermittent/successive misfire occurrence decision routine.
Figure 8:
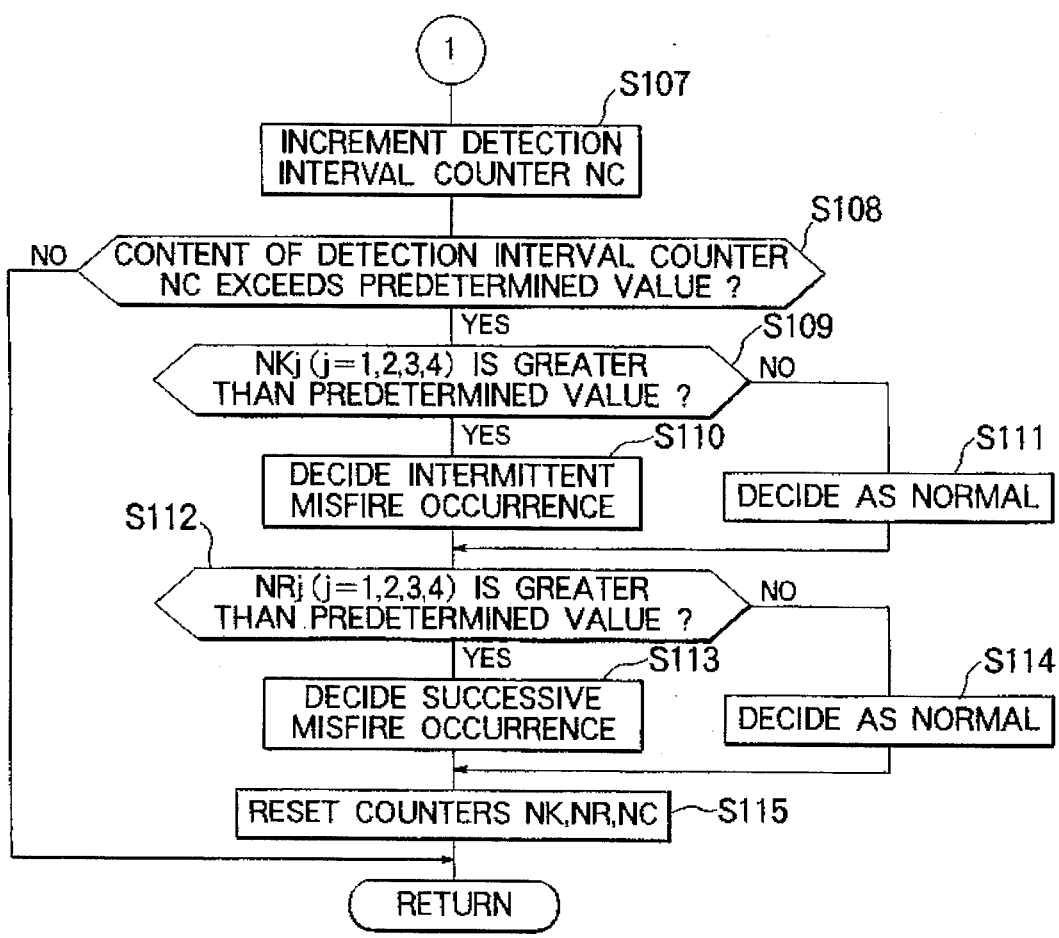
FIG. 8 is a flow chart showing a routine executed in succession to the processing shown in FIG. 7.

FIG. 7 is a flow chart for illustrating an intermittent misfire occurrence decision routine, while FIG. 8 is a flow chart illustrating a successive misfire occurrence decision routine. Further, FIG. 9 is a waveform diagram for illustrating behavior of the acceleration upon intermittent misfire occurrence, while FIG. 10 is a waveform diagram illustrating variations in the acceleration when misfire occurs continuously or successively.

Figure 9:
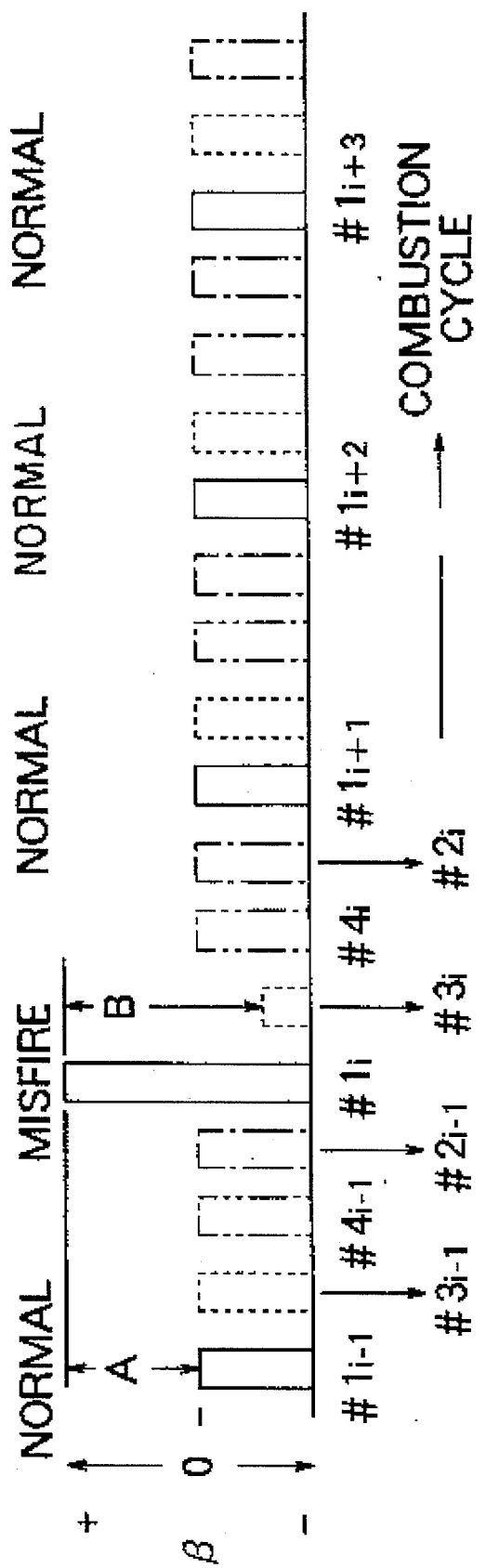
FIG. 9 is a waveform diagram for illustrating behavior of acceleration upon intermittent misfire occurrence.
Figure 10:
FIG. 10 is a waveform diagram illustrating behavior of the acceleration when misfire occurs successively.

First, description will be directed to the detection of the intermittent occurrence of misfire by reference to FIGS. 7 and 9.

In FIG. 9 which shows how the acceleration changes when the misfire takes place intermittently in the first cylinder #1, the combustion cycle is taken along the abscissa with the acceleration β being taken along the ordinate. In the combustion cycle taken along the abscissa, intervals are set in accordance with the sequence of detecting the accelerations β for the individual cylinders, correspondingly, wherein the acceleration β corresponding to the first cylinder #1 is shown in a solid line, the acceleration β for the third cylinder #3 is in a broken line, the acceleration β for the fourth cylinder #4 is shown in a double-dot broken line and the acceleration β for the second cylinder #2 is shown in a single-dot broken line.

The accelerations β taken along the ordinate are represented in the form of bar graphs for clarification. In this conjunction, it should be understood that the length of the bar is physically of no meanings and that the apexes of the bars correspond to the accelerations in the individual cylinders.

Referring to FIG. 9, the acceleration β#1$_{i-1}$ determined precedingly at a time point #1$_{i-1}$ before occurrence of misfire has a value close to zero. In contrast, the acceleration β#1$_i$ assumes an increased value at the misfire occurring time point #1$_i$. When the normal engine operation is restored, the acceleration resumes the value close to zero, as indicated at the time points #1$_{i+1}$ et seq. By taking into consideration this fact, it is taught according to the invention incarnated in the instant embodiment to determine a history of the acceleration in a given same cylinder (indicated by A in FIG. 9) in accordance with the following expression:

$$\Delta \beta Kj = \beta \# j_i - \beta \# j_{i-1} \tag{11}$$

where K represents an evaluation index of the intermittent misfire, and j represents the cylinder identification numbers (i.e., j=1, 2, 3, 4). The cylinder identification numbers are handled as the serial numbers in the processing. However, in actuality, the first to fourth cylinders #1 to #4 are allocated with the serial numbers "1", "3", "4" and "2" in this order, respectively. Accordingly, when j=2 (the third cylinder #3), the notation (j–1) represents the first cylinder #1, i.e., the adjacent cylinder fired immediately before.

The quantity ΔβKj mentioned above is then compared with a misfire decision reference value βKC, and it is decided that the intermittent misfire takes place in the cylinder of concern when the relation given by the following expression is satisfied.

$$\Delta\beta Kj > \beta KC \tag{12}$$

In the flow chart shown in FIG. 7, the intermittent misfire occurrence decision processing is executed through a routine including steps S101, S102 and S103. More specifically, in the step S101, the intermittent misfire occurrence detection processing is activated on a cylinder-by-cylinder basis by performing calculation in accordance with the expression (11). In the step S102, the misfire decision is made in accordance with the aforementioned expression (12).

When the relation given by the above-mentioned expression (12) is satisfied, the processing proceeds to the step S103 where an intermittent misfire event counter NKj (not shown) provided in the memory 10 for counting the number of occurrences of misfire event for each cylinder is incremented. In this regard, it should be mentioned that the intermittent misfire counter NKj is reset to zero upon starting of the program and sequentially incremented every time the misfire event Occurs during a predetermined interval or period set for the misfire detection. On the other hand, unless the relation given by the expression (12) is satisfied, the decision step S102 results in negation (NO), whereupon the intermittent misfire occurrence decision routine comes to an end.

Next, description will be directed to the successive misfire occurrence phenomenon by reference to FIGS. 7 and 10.

FIG. 10 shows how the acceleration changes when the misfire takes place successively or continuously in the first cylinder #1. In the figure, the combustion cycle is taken along the abscissa with the acceleration β being taken along the ordinate, as in the case of FIG. 9. In the combustion cycle taken along the abscissa, misfire detection intervals are set in correspondence with the sequence of detecting the accelerations β for the individual cylinders, wherein the acceleration β corresponding to the first cylinder #1 is shown in a solid line, the acceleration β for the third cylinder #3 is in a broken line, the acceleration β for the fourth cylinder #4 is shown in a double-dot broken line and the acceleration β for the second cylinder #2 is shown in a single-dot broken line. The accelerations β taken along the ordinate are represented in the form of bar graphs for clarification. In this conjunction, it should be noted that the length of the bar is physically of no meanings and that the apexes of the bars correspond to the accelerations in the individual cylinders.

Referring to FIG. 10, the acceleration β#$1_{i-1}$ determined precedingly at a time point #$1_{i-1}$ before occurrence of misfire has a value close to zero. In contrast, at the misfire occurring time point #$1_i$, the acceleration β#$1_i$ assumes an increased value, as in the case of the intermittent misfire occurrence phenomenon. However, since the misfire takes place in succession, difference in the acceleration in a given same cylinder after the time point $_{i+1}$ decreases, rendering it impossible to use the relation given by the expression (11) mentioned before. Accordingly, by taking into consideration the fact that the acceleration remains unchanged in the other cylinders, a history of the acceleration in the given same cylinder (indicated by A in FIG. 10) is determined in accordance with the following expression:

$$\Delta\beta Rj = \beta\#j_i - \beta\#j_{i-2} \tag{13}$$

where R represents an evaluation index of the successive or continuous misfire phenomenon, and j represents the cylinder identification numbers (i.e., j=1, 2, 3, 4), which are handled as the serial numbers in the processing. However, in actuality, the first to fourth cylinders #1 to #4 are allocated with the serial numbers "1", "3", "4" and "2" in this order, respectively. Accordingly, when j=3 (the fourth cylinder #4), the notation (j–2) represents the first cylinder #1, i.e., the adjacent cylinder fired two cycles before.

The quantity ΔβRj mentioned above is compared with a misfire decision reference value βRC, and it is decided that the successive misfire phenomenon takes place in the cylinder of concern when the relation given by the following expression is satisfied.

$$\Delta\beta Rj > \beta RC \tag{14}$$

In the flow chart shown in FIG. 7, the successive misfire occurrence decision processing is executed through a routine including steps S104, S105 and S106. More specifically, in the step S104, the successive misfire occurrence detection processing is performed on a cylinder-by-cylinder basis by performing calculation in accordance with the expression (13). In the step S105, the misfire decision is made in accordance with the aforementioned expression (14).

When the relation given by the above-mentioned expression (14) is satisfied, the processing proceeds to the step S106 where a successive misfire event counter NRj (not shown) provided in the memory 10 for counting the number of occurrences of misfire event for each cylinder is incremented. In this regard, it should be mentioned that the successive misfire counter NRj is reset to zero upon starting of the program and sequentially incremented every time the misfire event occurs during a predetermined interval or period set for the misfire detection. On the other hand, unless the relation given by the expression (14) is satisfied, the decision step S105 results in negation (NO), whereupon the successive misfire occurrence decision routine comes to an end.

In this manner, the intermittent and successive misfire occurrence decisions are performed at ignition timing for each cylinder, wherein the results of the decisions are stored cumulatively in the respective counters provided independent of each other.

Next, referring to FIG. 8, description will be made of the misfire occurrence decision during a predetermined detection interval.

FIG. 8 is a flow chart showing a routine executed in succession to the processing shown in FIG. 7. Referring to FIG. 8, in a step S107, a detection interval counter NC (not shown) provided in the memory 10 for counting the detection intervals is incremented. This counter NC is reset to zero upon starting of the routine or program shown in FIG. 8 and incremented sequentially every times the step S107 is executed.

In a step S108, the count value of the detection interval counter NC is compared with a predetermined value (decision reference value) representing a predetermined number of times of the misfire detections. When the count value is not greater than the predetermined value, the processing resumes the step S13 shown in FIG. 5. If otherwise, the processing proceeds to a step S109 where a final misfire decision is executed for the predetermined detection interval.

In the step S109, the contents of the intermittent misfire event counters NKj are read out to compare the count values representing the number of occurrences of misfire in the individual cylinders with a predetermined value (decision reference value) representing the misfire ratio to be detected during the predetermined detection interval. When the misfire ratio, i.e., the count value of the misfire event detection counter is greater than the predetermined value, a step S110 is executed to decide that the misfire event occurs intermittently. On the other hand, unless the count is greater than the predetermined value, a step S111 is executed and decision is made that the cylinder is operating normal.

Parenthetically, according to the OBB-II Regulations in the U.S.A., the misfire ratio of about 2% is prerequisite. Thus, by using this misfire ratio as the predetermined value for the comparison mentioned above, the misfire events detected erroneously under the influence of variation in the rotation speed (rpm) due to other causes than the misfire can be excluded from the misfire decision.

Next, in a step S112, the contents of the successive misfire counter NRj are read out to be compared with a predetermined value representing the misfire ratio to be detected in the predetermined detection interval. When the misfire ratio, i.e., the count value representing the number of times the misfire occurred in each cylinder, is not smaller than the predetermined value, the routine proceeds to a step S113 where the successive misfire phenomenon is decided as occurring in the relevant cylinder. If otherwise, it is decided in a step S114 that the cylinder operates normally.

Subsequently, the routine proceeds to a step S115 where the intermittent misfire event counter NKj, the successive misfire counter NRj and the detection interval counter NC are reset to zero in preparation for the misfire decision for the succeeding detection interval, whereon the step S13 shown in FIG. 5 is resumed.

In this way, the acceleration $\beta$ defined hereinbefore is calculated for each cylinder periodically at the ignition timing, the numbers of misfires as taken place in the individual cylinders are stored in the intermittent misfire event counters or the successive misfire event counters provided independently for the individual cylinders, respectively, and the final or ultimate misfire decision is made by referencing the number of misfire events occurred during the predetermined detection interval.

Embodiment 2

In the case of the first embodiment, the acceleration $\beta$ in each cylinder is used for evaluating the history of variation in the engine rotation speed. According to the instant embodiment, it is proposed to determine a difference $\Delta \beta S$ in the acceleration $\beta$ between the adjacent cylinders in accordance with the following expression:

$$\Delta \beta S = \beta \#j_{-1} - \beta \#j \qquad (15)$$

The intermittent and successive misfire occurrence decisions are then made in accordance with the aforementioned expressions (11) to (14) by replacing $\Delta \beta$ by $\Delta \beta S$ determined in accordance with the above expression (15).

With the instant embodiment, the sensitivity of misfire detection can be further increased because magnitude of change in the acceleration $\beta$ is more remarkable upon occurrence of misfire, as shown by a symbol B in FIGS. 9 and 10.

Embodiment 3

In the case of the first embodiment, the decision reference value ($\beta KC$) is assumed to be a fixed value, as can be seen in the expression (12). In contrast, according to this embodiment, the decision reference value may be so selected as to reflect the engine rotation speed (rpm) and engine load which can be retrieved from a two-dimensional map containing the data of engine rotation speed (rpm) and the load as parameters. Besides, in order to accommodate differences in acceleration and combustion among the individual cylinders, a value resulting from a linear filtering of the detected acceleration value may be used. Thus, in accordance with the instant embodiment of the invention, the intermittent misfire decision is executed in accordance with:

$$\Delta \beta Kj_{(i)} > f(Ne, Ce) + \Delta \beta Kj \qquad (16)$$

where f (Ne, Ce) represents a value retrieved from the two-dimensional map and $\Delta \beta Kj$ represents the value obtained by filtering linearly the detected acceleration value.

Embodiment 4

The teaching of the invention described above in conjunction with the third embodiment may be applied to the successive misfire decision. More specifically, according to this embodiment, the reference value for the successive misfire decision may be so set as to reflect the engine rotation speed (rpm) and the engine load which may be given by a function capable of retrieving these values from a two-dimensional map containing the data of engine rotation speed (rpm) and load as parameters. Besides, in order to accommodate differences or dispersions in the acceleration and the combustion among the individual cylinders, a value resulting from a linear filtering of the detected acceleration value may also be taken into account. Thus, in accordance with the instant embodiment of the invention, the successive misfire decision is executed in accordance with:

$$\Delta \beta Rj_{(i)} > g(Ne, Ce) + \Delta \beta Rj \qquad (17)$$

where g(Ne, Ce) represents a value retrieved from the two-dimensional map and $\Delta \beta Rj$ represents the value obtained by filtering linearly the detected acceleration value.

Embodiment 5

Next, a fifth embodiment of the misfire detecting apparatus according to a second aspect of the invention will be described.

Figure 11:
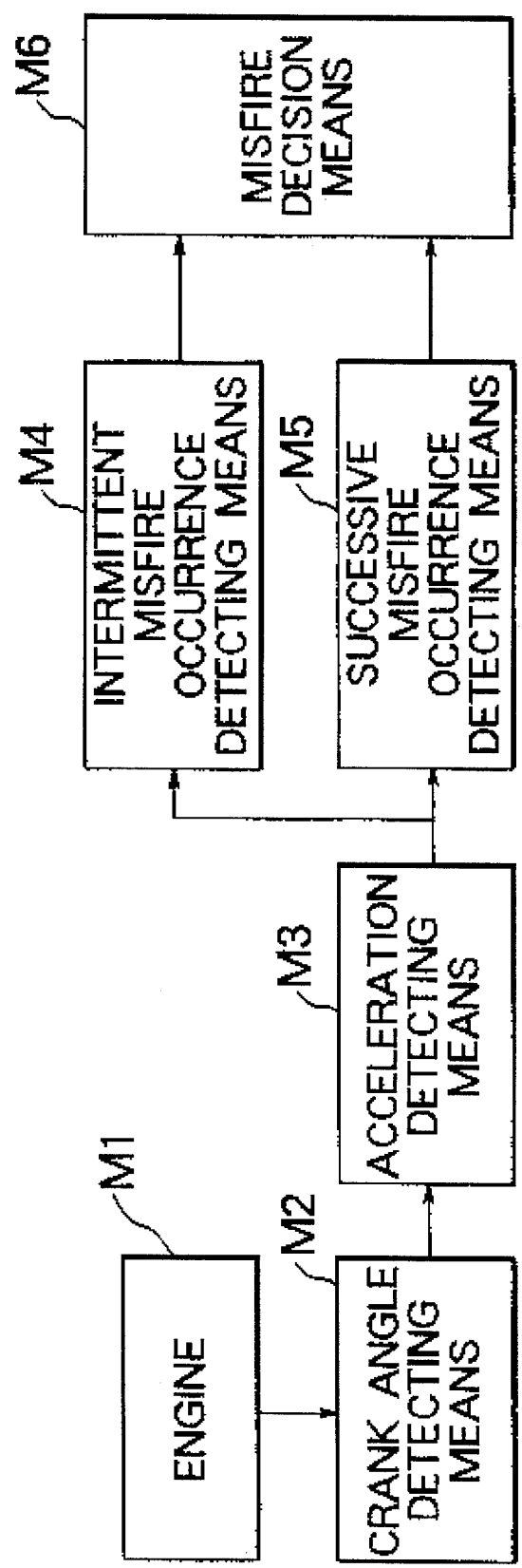
FIG. 11 is a functional block diagram showing conceptually a structure of a misfire detecting apparatus for an internal combustion engine according to a fifth embodiment directed to the second aspect of the invention.

FIG. 11 is a functional block diagram showing conceptually a structure of a misfire detecting apparatus for an internal combustion engine according to the instant embodiment.

As is apparent from comparison of FIG. 11 with FIG. 1, the functional configuration of the misfire detecting apparatus according to the instant embodiment differs from the first embodiment in that a misfire decision means M6 is additionally provided, being connected to the outputs of the intermittent misfire occurrence detecting means M4 and the successive misfire occurrence detecting means MS, respectively. The misfire decision means M6 serves to count the misfire detection signals supplied from the detection means M4 and M5 for predetermined intervals or periods, respectively, to thereby decide that the misfire takes place intermittently or successively in the cylinder of concern when the corresponding one of the above-mentioned counts of the misfire detection signals exceeds a predetermined reference value. The hardware configuration of the misfire detecting apparatus is same as that shown in FIG. 2 except that the microcomputer 9 is imparted with a function for realizing the misfire decision function-M6 mentioned above. Further, the crank angle detection means M2, the acceleration detection means M3, the intermittent misfire occurrence detection means M4 and the successive misfire occurrence detection means M5 serve for the same functions as described hereinbefore in conjunction with the first embodiment of the invention. Accordingly, repeated description of them will be unnecessary.

In the following, operation of the misfire detecting apparatus according to the instant embodiment will be described by reference to FIG. 12.

Figure 12:
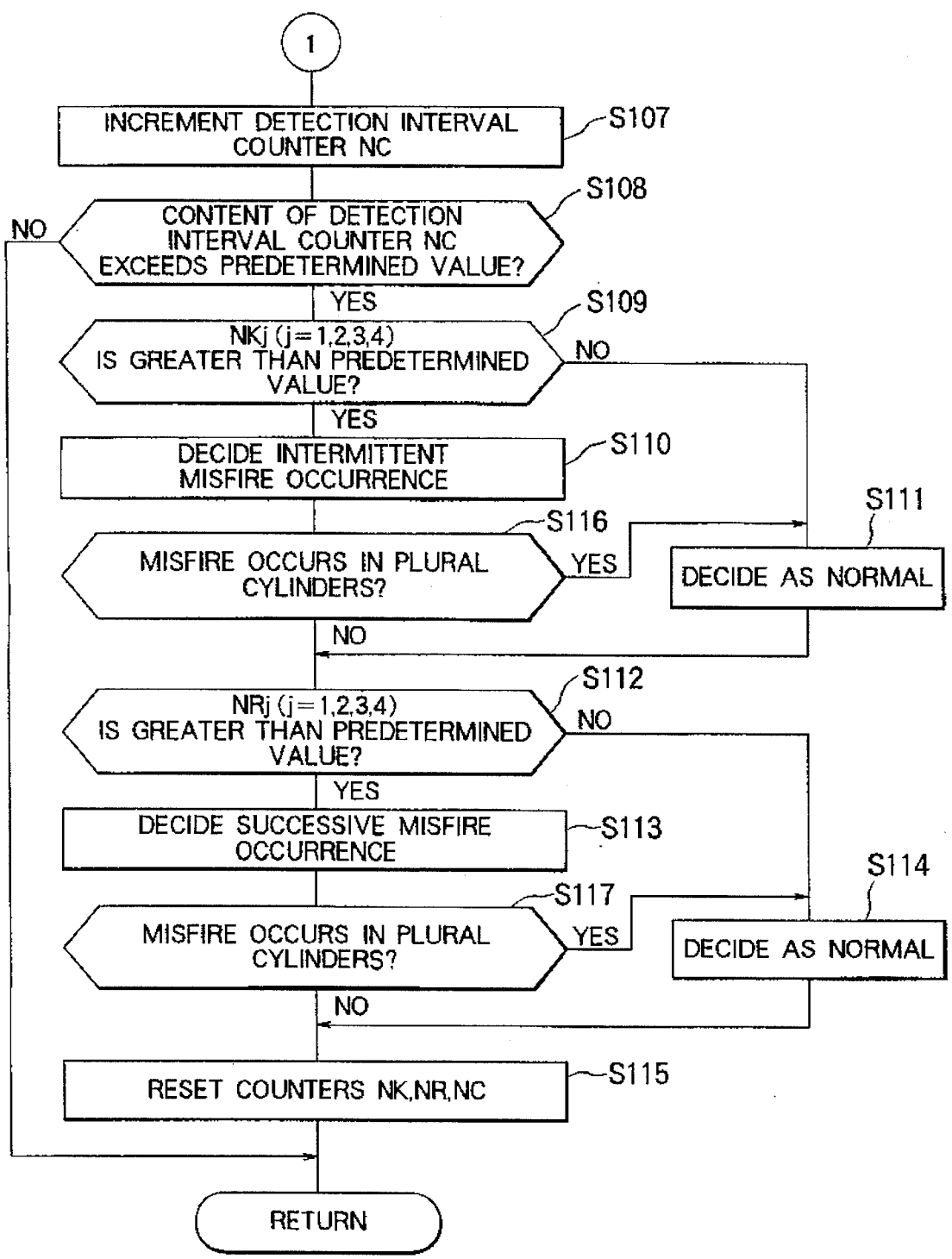
FIG. 12 is a flow chart showing a processing executed in succession to the processing shown in FIG. 7 in the fifth embodiment.

FIG. 12 is a flow chart showing a processing executed in succession to the processing described hereinbefore by reference to FIG. 7. Referring to FIG. 12, in a step S107, a detection interval or period counter NC (not shown) provided in the memory 10 for counting the detection intervals or periods is incremented. This counter NC is reset to zero upon starting of the program shown in FIG. 12 and incremented sequentially every times the step S107 is executed.

In a step S108, the count value of the detection interval (period) counter NC is compared with a predetermined value (decision reference value) representing a predetermined number of times the misfire detections were carried out. When the count value is not greater than the predetermined value, the processing resumes the step S13 shown in FIG. 5 mentioned hereinbefore. If otherwise, the processing proceeds to a step S109 where a final misfire decision is executed for the predetermined detection interval or period.

In the step S109, the contents of the intermittent misfire event counters NKj are read out to compare the count values representing the number of occurrences of misfire in the individual cylinders with a predetermined value (decision reference value) representing the misfire ratio to be detected during the predetermined detection interval or period. Parenthetically, according to the OBB-II Regulations in the U.S.A., the misfire ratio of about 2% is prerequisite. Thus, by using this misfire ratio as the predetermined value for the comparison mentioned above, the erroneous detection of the misfire events due to the influence of accidental variation in the rotation speed (rpm) can be prevented by invalidating the misfire decision when the number of misfire events as detected is smaller than the predetermined value mentioned above.

When it is decided in the step S109 that the misfire ratio, i.e., the count value indicating the number of the misfire events as detected exceeds the predetermined value, the processing proceeds to a step S110 where decision is made that the intermittent misfire occurs, to thereby set the intermittent misfire decision flag. If otherwise, the processing proceeds to a step S111 where the cylinder of concern is decided as operating normally, and the corresponding intermittent misfire decision flag is reset.

Next, consideration will be paid to a periodical variation in the engine speed (rpm) which makes appearance when the motor vehicle is driven on an uneven road such as a surface-corrugated road, a stone-paved read or the like.

Figure 13:
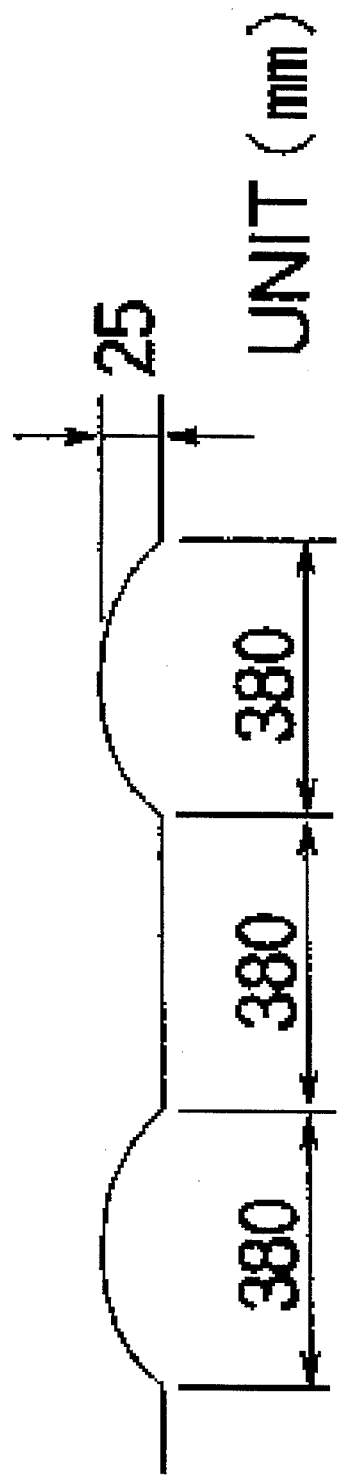
FIG. 13 is a schematic diagram showing a section of a corrugated road used in an experimental vehicle running test.

FIG. 13 is the schematic diagram showing a section of a corrugated road used in an experimental vehicle running test. This road is constructed by arraying continuously corrugations each having a height of 25 mm and a width of 380 mm.

Figure 14:
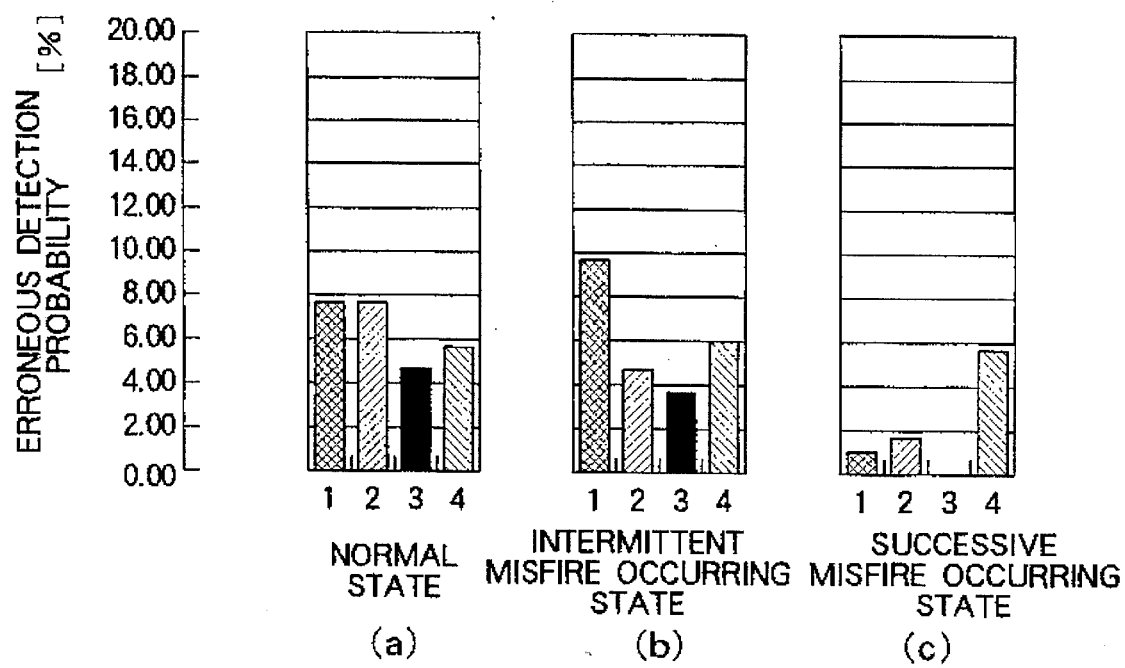
FIGS. 14 and 15 are views showing, respectively, results of the running test carried out by driving a motor vehicle on the corrugated road mentioned above at a vehicle speed of 40 Km/hour.
Figure 15:
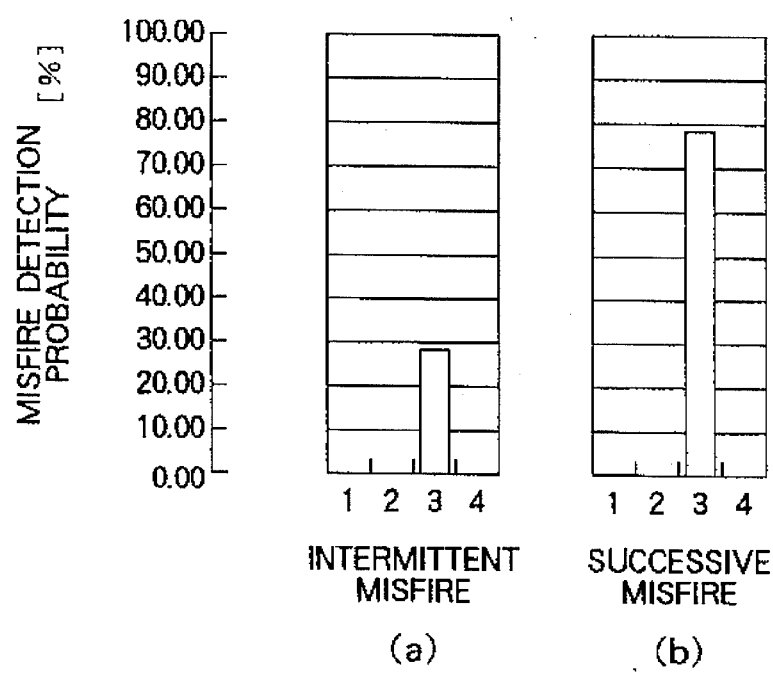

FIGS. 14 and 15 are views showing results of the running test carried out by driving a motor vehicle on the corrugated road mentioned above at a running speed of 40 Km/hour.

In FIG. 14, erroneous misfire detection probability in the normal state of engine operation is taken along the ordinate while the cylinder identification number is taken along the abscissa. The erroneous misfire detection probability is determined in accordance with the following expression:

$$\text{erroneous detection probability} = \text{number of erroneous detections divided by a predetermined number of normal combustions and multiplied by 100 (\%)} \qquad (18)$$

In FIG. 14, the erroneous detection probability in the normal state of combustion is shown at (a), while the erroneous detection probability in the state in which the misfire takes place intermittently at the misfire ratio of 2% in the third cylinder #3 is shown at (b) with the erroneous detection probability in the state where the third cylinder #3 undergone the successive misfire at the ratio of 100% being shown at (c).

As can be seen from FIG. 14, when a motor vehicle is driven on a corrugated road surface such as shown in FIG. 13, periodical variation in the torque and hence in the rotation speed (rpm) are transmitted to the internal combustion engine via the wheels upon passing over valleys and mounts in the road surface, involving erroneous misfire detections for a plurality of cylinders notwithstanding of the fact that the misfire does not really take place (see FIG. 14 at (a)). Parenthetically, in the case shown at (c), erroneous misfire detection probability for the cylinder #3 is zero. This can be explained by the fact that the successive misfire phenomenon occurs in this cylinder #3 and thus the equation (18) mentioned above can not apply valid.

In FIG. 15, the misfire detection probability for the misfire caused artificially is taken along the ordinate with the cylinder identification numbers being taken along the abscissa. The misfire detection probability is determined in accordance with $$\text{misfire detection probability} = \text{number of misfire detections divided by number of actual misfires and multiplied by 100} \qquad (19)$$

In the case shown at (a) in FIG. 15, the misfire is caused to occur intermittently in the third cylinder #3, while in the case shown at (b) in the same figure, misfire is caused to occur continuously or successively. As can be seen from FIG. 15, the misfire detection probability is also influenced by the road surface condition for the same reason as described previously. In this conjunction, the detection probability is as low as 30% or less in the case of the intermittent misfire, while that for the successive misfire is as high as about 80%. This is because the angular speed change pattern is regular and thus less susceptible to the road surface condition in the case of the successive misfire phenomenon.

According to the invention incarnated in the instant embodiment, the experimentally confirmed fact is made use of for deciding the occurrence of misfire. More specifically, when misfire is detected for one cylinder, the misfire detection information for the other cylinders is referenced, and the misfire decision for the one cylinder is invalidated when the misfire is simultaneously detected for a plurality of cylinders. In this manner, the periodical change in the engine rotation speed transmitted to the engine via the wheels in the course of running on an uneven road such as a corrugated road surface can definitely be discriminated from the change in the rotation speed due to the misfire phenomenon taking place in the cylinder(s).

Turning back to FIG. 12, in a step S116, the misfire information for the other cylinders as stored in the memory 10 is referenced. When misfire is detected for more than a predetermined number of cylinders, the misfire detection information is invalidated with the result of decision being rewritten as being normal in a step S111. If otherwise, the result of the intermittent misfire decision is retained as it is (step S112).

Further, in the step S112, the content of the successive misfire event counter NRj is read out to thereby compare the count value for each of the cylinders with a predetermined value (decision reference value) representing the misfire ratio to be detected during the predetermined interval or period. When the misfire ratio, i.e., the count value indicating the number of misfire events as detected for each cylinder exceeds the predetermined number, it is decided in a step S113 that misfire events have taken place in succession, whereby the successive misfire decision flag is set in the memory 10. If otherwise, the processing proceeds to a step S114 where it is decided that the cylinder of concern operates normally, and the successive misfire decision flag set in the memory 10 in correspondence with the cylinder identification number is cleared.

Subsequently, in a step S117, the misfire information of the other cylinders stored in the memory 10 is referenced. When the misfire is detected for more than a predetermined number of cylinders, the misfire detection information is invalidated by writing the result of the decision as being normal in a step S114, since this misfire detection is ascribable to the periodical change of the engine speed due to other cause than the misfire event.

In a step S115, the intermittent misfire counter $NK_j$, the successive misfire counter $NR_j$ and the detection interval counter NC are reset to zero in preparation for the misfire decision in a succeeding interval or period.

In this way, the acceleration defined hereinbefore is calculated for each cylinder periodically at the ignition timing, the numbers of misfires as taken place in the individual cylinders are stored in the intermittent misfire event counters or the successive misfire event counters provided independently for the individual cylinders, respectively, and the final or ultimate misfire decision is made by referencing the number of misfire events occurred during the predetermined detection interval, wherein when the misfire is detected for one cylinder, the final misfire decision is performed by referencing the misfire information for the other cylinders.

In the above descriptions, it is assumed that the same decision reference value is employed for the intermittent misfire occurrence decision and the successive misfire occurrence decision. However, in order to enhance further the noise withstanding capability against the periodical speed change noise, the reference value for the successive misfire decision which enjoys a higher detection probability may be set higher than that for the intermittent misfire decision which is inferior in respect to the detection probability.

At this juncture, it should mentioned that the teachings of the invention incarnated in the first to fourth embodiments can equally be adopted in the fifth embodiment substantially to same advantageous effects.

Embodiment 6

Now, a sixth embodiment of the misfire detecting apparatus according to a third aspect of the invention will be described.

Figure 16:
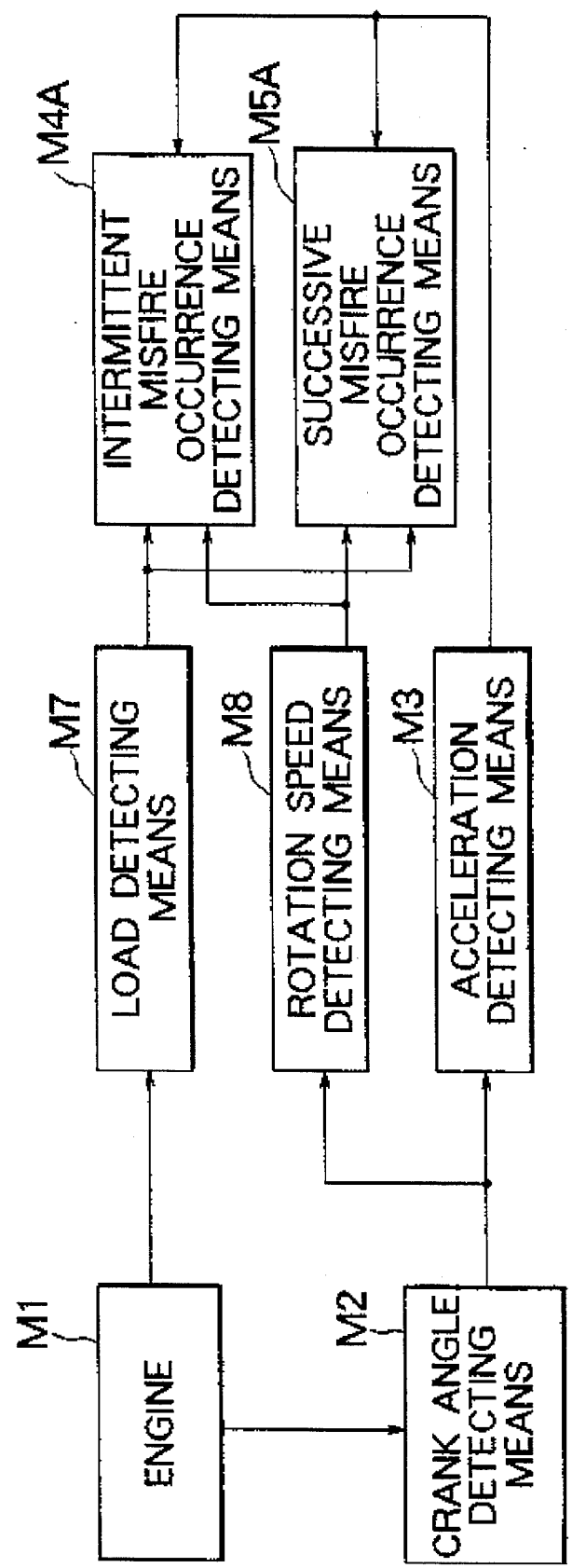
FIG. 16 is a functional block diagram showing conceptually a structure of a misfire detecting apparatus for an internal combustion engine according to sixth embodiment aspect of the invention directed to the third aspect thereof.

FIG. 16 is a functional block diagram showing conceptually a structure of a misfire detecting apparatus for an internal combustion engine according to the instant embodiment.

As can be seen from FIG. 16, the functional configuration of the misfire detecting apparatus according to the instant embodiment differs from the first embodiment in that an engine load detecting means M7 is interposed between the engine M1 and the intermittent and successive misfire occurrence detection means M4A and M5A and that an engine rotation speed detecting means M8 is interposed between the crank angle detecting means M2 on one hand and the intermittent misfire occurrence detecting means M4A and the successive misfire occurrence detecting means M5A on the other hand. The load detecting means M7 may be constituted, for example, by a air-flow meter for measuring an intake air flow or an intake pipe pressure sensor or a throttle opening sensor for detecting an opening degree of a throttle valve provided for regulating the intake air flow, although not shown. Further, the engine rotation speed detecting means M8 may be constituted by a conventional or appropriate means for detecting the rotation speed of the engine on the basis of the output signal from the crank angle detecting means M2.

In the case of the misfire detecting apparatus according to the instant embodiment, the intermittent misfire detecting means M4A having inputs connected to the outputs of the load detecting means M7 and the rotation speed detecting means M8 serves to make the intermittent misfire decision for the individual cylinders of the engine on the basis of the acceleration information available from the output of the acceleration detecting means while taking into account the engine operation state detected by the load detecting means M7 or the rotation speed detecting means M8. On the other hand, the successive misfire occurrence detecting means M5A having inputs coupled to the output of the load detecting means M7 and the rotation speed detecting means MS serves to detect the successive misfire occurrences for each cylinder on the basis of the acceleration detected by the acceleration detecting means M3 while taking into consideration the engine operation state represented by the output signal of the load detecting means M7 or that of the rotation speed detecting means M8. The hardware configuration of the misfire detecting apparatus according to the instant embodiment is same as that shown in FIG. 2 except that the microcomputer 9 is imparted with the functions for realizing the means M4A, M5A, M7 and M8 mentioned above. Further, the crank angle detection means M2 and the acceleration detection means M3 serve for the same functions as described hereinbefore in conjunction with the first embodiment of the invention. Accordingly, repeated description of them will be unnecessary.

In the following, operation of the misfire detecting apparatus according to the instant embodiment will be described by reference to FIG. 17 and FIG. 18.

Figure 17:
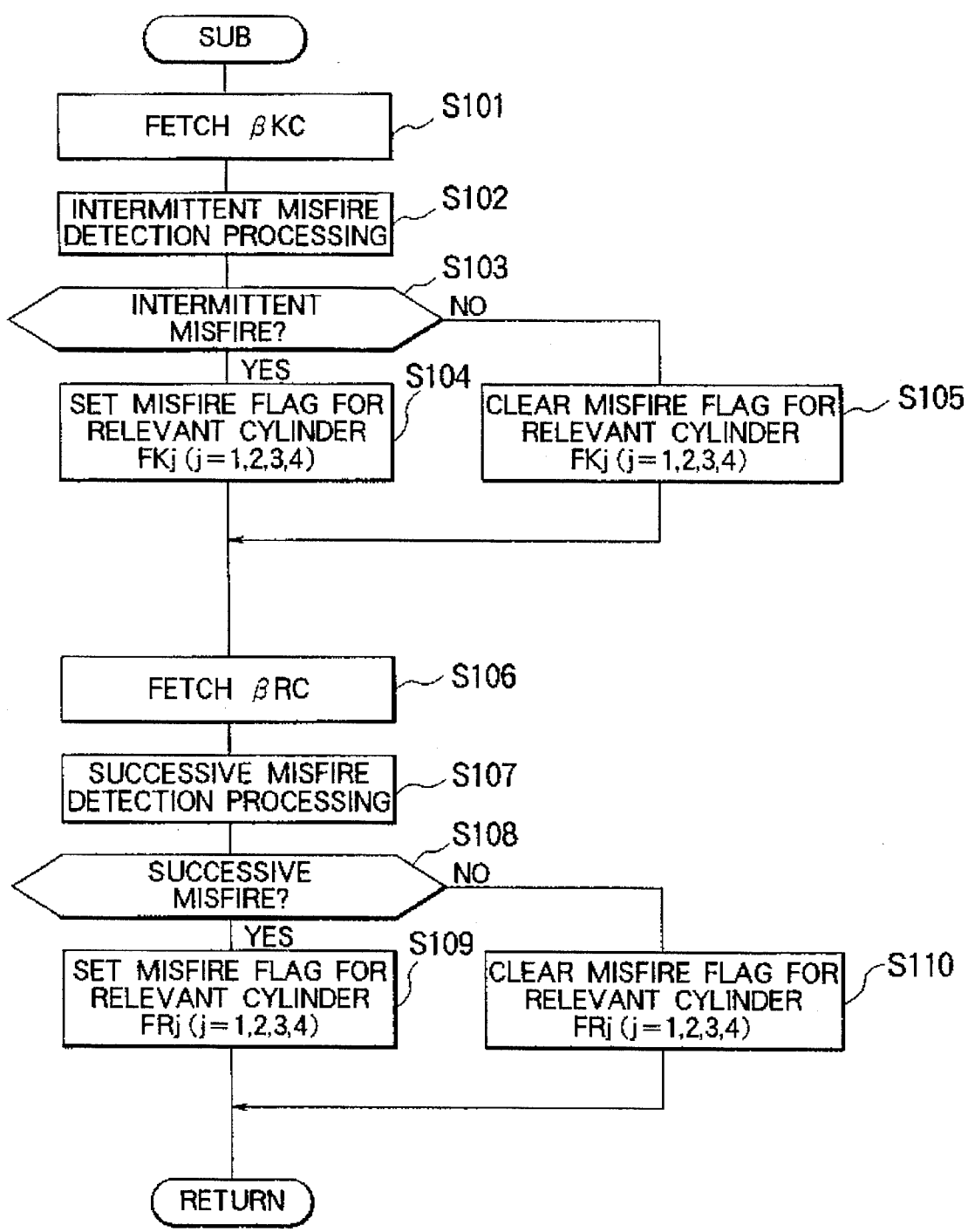
FIG. 17 is a flow chart for illustrating intermittent and successive misfire decision processing according to the sixth embodiment.
Figure 18:
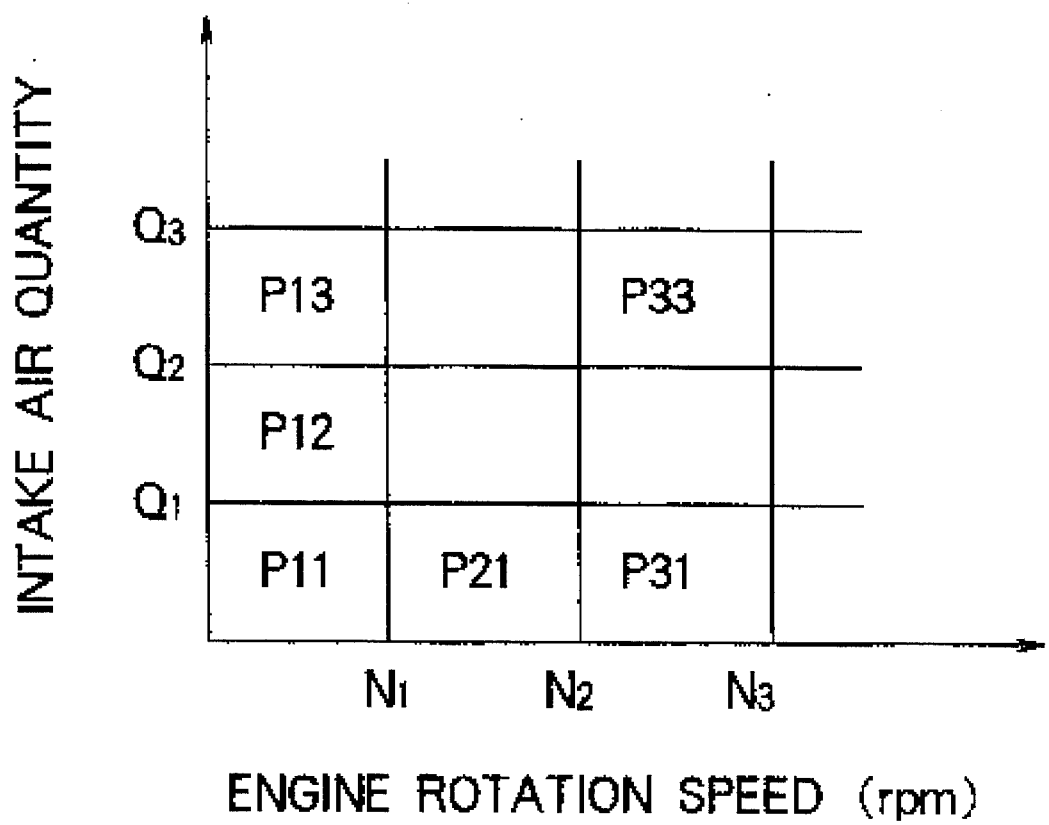
FIG. 18 is a misfire decision value map which is referenced in executing the processing shown in FIG. 17.

FIG. 17 is a flow chart for illustrating intermittent and successive misfire decision processings according to the instant embodiment, and FIG. 18 is a misfire decision value map which is referenced upon executing the processing shown in FIG. 17.

Referring to FIG. 17, the intermittent misfire occurrence decision routine is executed in steps S101 to S105. More specifically, in the step S101, the misfire decision reference value $\beta KC$ is read out from the misfire decision value map which contains the misfire decision reference values with various engine operation states being used as parameters. It should be mentioned that the misfire decision reference value map is previously stored in the memory 10 of the microcomputer 9 (FIG. 2). In FIG. 18, the engine rotation number N is taken along the abscissa, wherein the engine rotation number or engine rotation speed, to say in another way, is divided into three intervals N1, N2 and N3. It goes without saying that the engine rotation speeds (rpm) in these intervals can be arithmetically derived from the output of the crank angle sensor 6 (FIG. 2).

Further, in FIG. 18, there are taken along the ordinate the parameters indicating the engine loads. As the parameters, the intake air quantity Q measured by the air flow meter (not shown) is used and divided into intake air quantity ranges Q1, Q2 and Q3. Thus, there are defined a number of zones in the map, wherein these zones are allotted with the misfire decision reference values Pn,q (n=1, 2, 3 and q=1, 2, 3). The map value read out from the map shown in FIG. 18 in dependence on the engine operation state determined on the basis of the rotation speed N and the intake air quantity Q is used as the misfire decision reference value $\beta KC$ in the decision expression (12) mentioned hereinbefore in conjunction with the first embodiment.

Next, in the steps S102 and S103, the intermittent misfire occurrence decision is made in accordance with the expression (12) mentioned above. If the condition given by the expression (12) is satisfied, the intermittent misfire flag FKj (where j represents the cylinder ID number) indicating the intermittent misfire state on a cylinder-by cylinder basis is set for the cylinder in which the misfire occurred (step S104).

On the other hand, unless the condition given by the expression (12) is satisfied, the intermittent misfire flag FKj is cleared in the step S105, whereupon the intermittent misfire occurrence decision processing comes to an end.

Next, description will turn to the successive misfire occurrence decision processing. Concerning the behavior of the acceleration $\beta$ upon occurrence of the successive misfire phenomenon, description has already been made in detail by reference to FIG. 10 in conjunction with the first embodiment. Accordingly, repeated description is omitted.

In the flow chart of FIG. 17, the successive misfire occurrence decision processing is executed through a routine including steps S106 to S110. More specifically, in the step S6, the map value corresponding to the current operation state of the engine is read out from a successive misfire occurrence decision value map prepare in the same table configuration as the map shown in FIG. 18 and stored in the memory 10 and used as the misfire decision reference value $\beta RC$ in the expression (14).

Next, in the step S107, the successive misfire detection processing is executed in accordance with the expression (13) mentioned hereinbefore in conjunction with the first embodiment, which is then followed by a step 108 where the successive misfire occurrence decision is made in accordance with the expression (14) also mentioned hereinbefore. When the condition given by the expression (14) is satisfied, the processing step S109 is executed, whereby the successive misfire flag FRj (where j represents the cylinder identifier) indicating the successive misfire occurrence state on a cylinder-by-cylinder basis is set in the memory 10 for the cylinder suffering from the successive misfires. On the other hand, unless the condition given by the expression (14) is satisfied, the successive misfire flag FRj is cleared in the step S110, whereupon the successive misfire occurrence decision processing comes to an end.

In this manner, the intermittent and successive misfire occurrence decision processings are performed for each of the cylinders periodically at the ignition timing, and the results of the decisions are stored in the form of the flags in the memory 10 independently from one to another cylinder.

Embodiment 7

Figure 19:
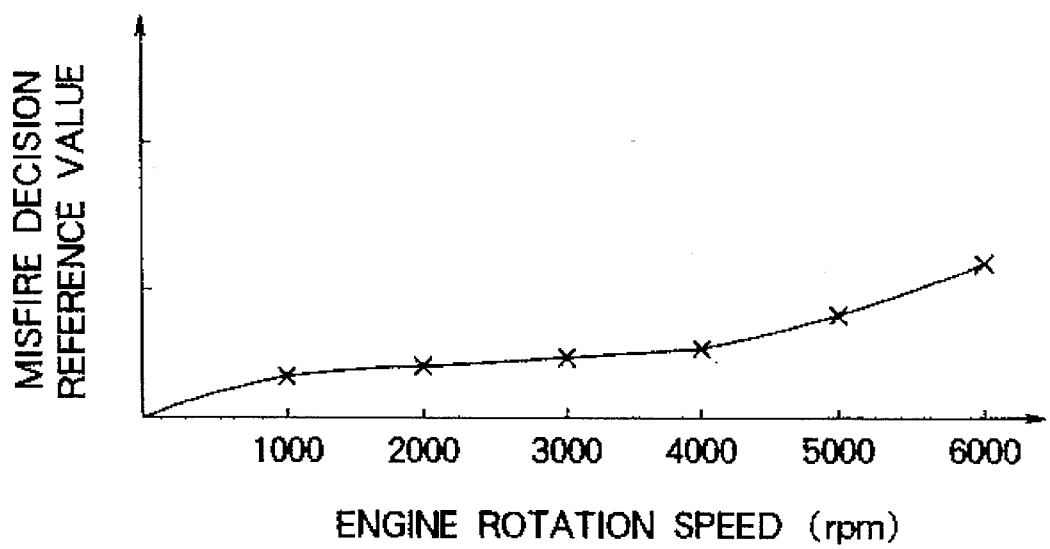
FIG. 19 is a characteristic diagram showing a relation between misfire decision reference value and engine rotation speed.
Figure 20:
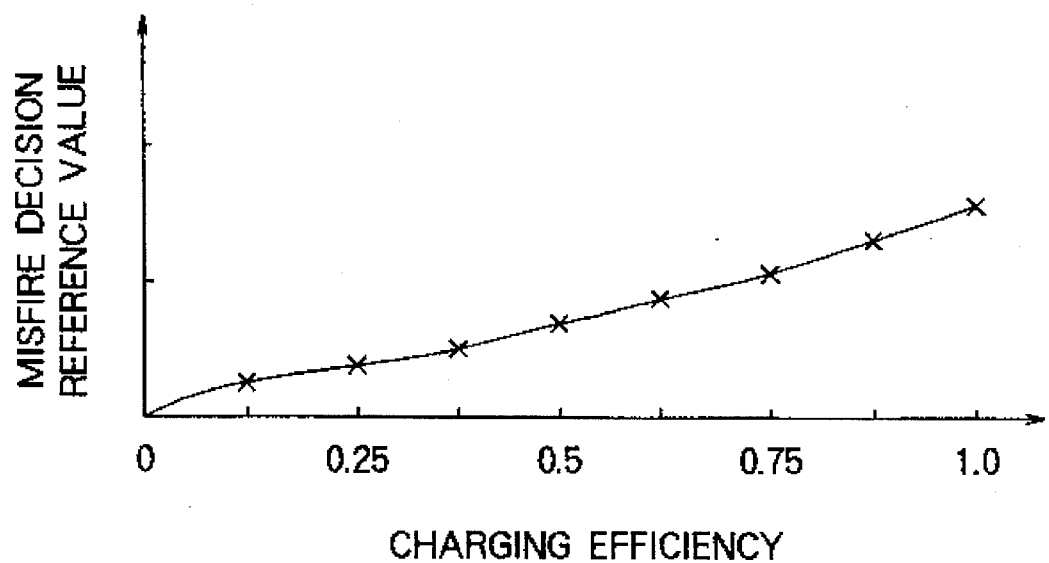
FIG. 20 is a characteristic diagram showing graphically a relation between misfire decision reference value and charging efficiency of the engine.

A seventh embodiment of the invention which corresponds to a modification of the sixth embodiment will be described by reference to FIGS. 19 to 21, wherein FIG. 19 is a characteristic diagram showing a relation between the misfire decision reference value and the engine rotation speed (rpm), and FIG. 20 is a characteristic diagram showing graphically a relation between the misfire decision reference value and the charging efficiency of the engine.

First, referring to FIG. 19, a relation existing between the misfire decision reference value and the engine rotation speed will be elucidated. In FIG. 19, the engine rotation speed (rpm) is taken along the abscissa while the misfire decision reference value is taken along the ordinate. The misfire detection signal characteristically increases as the engine rotation speed (rpm) increases. Accordingly, in order to secure a reliability in the misfire occurrence decision, the misfire decision reference value should be increased correspondingly as the engine speed (rpm) increases. In this regard, it should be noted that in the range of the engine speed lower than 1000 rpm, the misfire detection signal becomes feeble, making it impossible to discriminate it from the signal level in the normal combustion state, which will incur erroneous decision result.

As can be seen from FIG. 20 showing a relation between the misfire decision reference value and the charging efficiency representing the engine load (the charging efficiency is given by a ratio between the intake air flow measured by the air-flow meter and an amount of air occupying a cylinder stroke volume and increases as a function of the engine load), erroneous misfire detection is likely to occur in a range where the charging efficiency in low, i.e., in a range where the engine load is low. Accordingly, there is required a means for invalidating the result of the misfire decision in the low-speed or low-load range.

Figure 21:
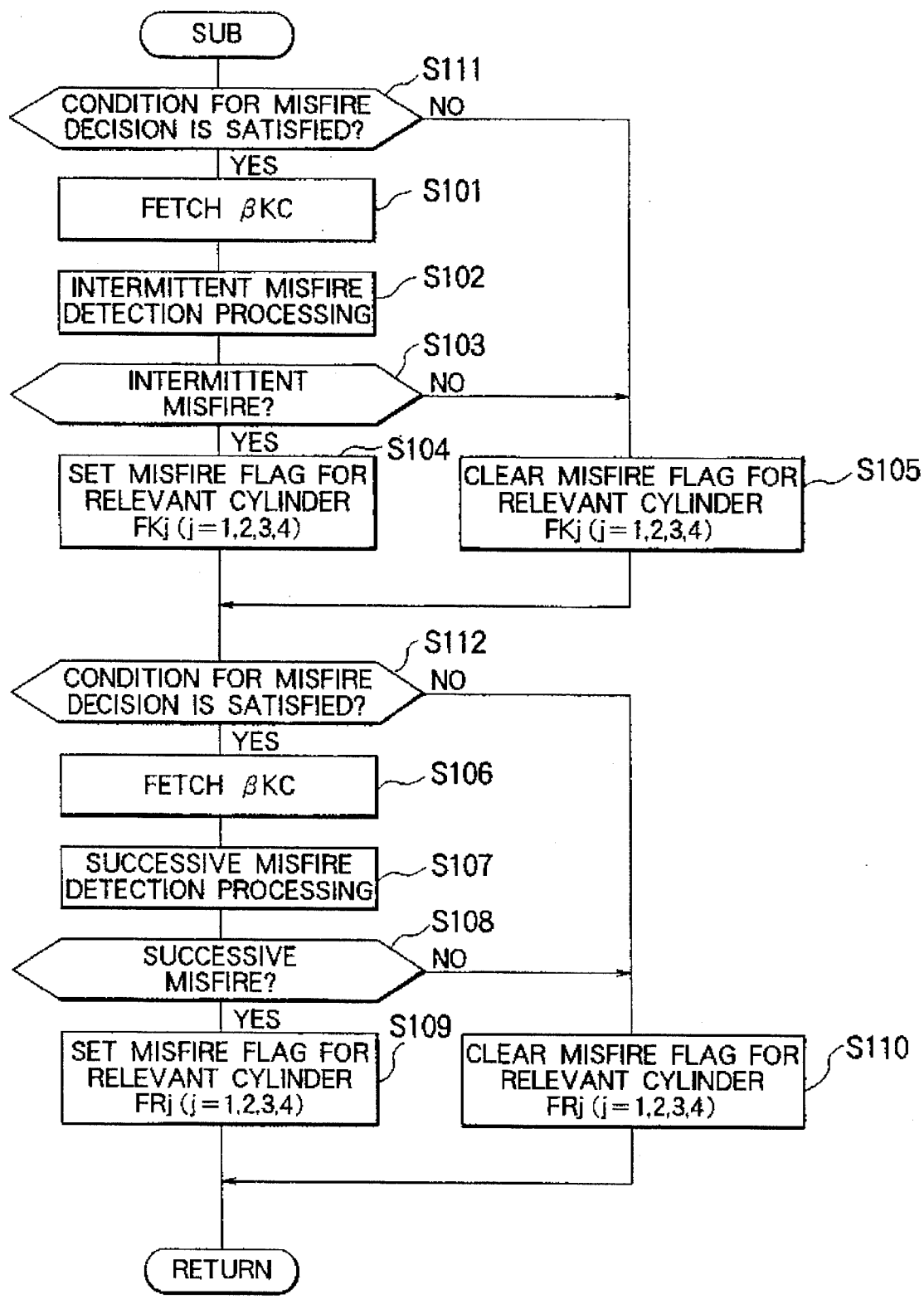
FIG. 21 is a flow chart showing a processing executed in the sixth embodiment.

FIG. 21 is a flow chart showing a processing executed in the instant embodiment. This flow chart differs from that of FIG. 17 in that steps S111 and S112 are added. Since all the other steps shown in FIG. 21 are same as those denoted by like reference characters in FIG. 17, repeated description thereof is omitted.

The step S111 is inserted immediately before the intermittent misfire decision processing. In this step S111, the engine rotation speed (rpm) or engine load is fetched to be compared with a predetermined value. When the former is smaller than the latter, it is decided that the condition for the intermittent misfire decision is not satisfied. Consequently, in the step S105, the intermittent misfire occurrence flag is cleared or reset and a normal state value is set as the result of the decision. On the other hand, when the engine speed or load is greater than the predetermined value, the ordinary misfire decision processing including the steps S101 et seq. is executed.

The step S112 is inserted immediately before the successive misfire decision processing. When the engine load or speed (rpm) is smaller than a predetermined value, it is decided that the condition for the successive misfire decision is not satisfied. Consequently, in the step S110, the successive misfire decision flag is cleared and a normal value is set as the result of the decision. If otherwise, the successive misfire decision processing including the steps S106 et seq. is executed.

In this way, in the range where the engine load or engine rotation speed is low, the misfire decision can be invalidated.

Embodiment 8

This embodiment corresponds to a modification of the seventh embodiment described above. In the case of the seventh embodiment, the steps S111 and S112 are added for invalidating the result of decision. In contrast, in accordance with the eighth embodiment, it is taught that the values set in the low-speed or low-load range in the misfire decision reference value map shown in FIG. 18 are selected greater than the misfire detection value so that the normal state is decided independent of the level of the misfire detection signal in this range. With this arrangement, substantially same effect as that of the seventh embodiment can be attained. Incidentally, although the low-speed or low-load range is set as the condition for invalidating the misfire decision, the invention is never restricted. Other parameter range where the erroneous misfire decision is likely to result may be employed for excluding the erroneous misfire decision.

Many features and advantages of the present invention are apparent form the detailed description and thus it is intended by the appended claims to cover all such features and advantages of the system which fall within the true spirit and scope of the invention. Further, singe numerous modifications and combinations will readily occur to those skilled in the art, it is not intended to limit the invention to the exact construction and operation illustrated and described.

By way of example, as the reference value for the misfire decision, there may equally be employed a mean value derived by averaging a predetermined number of acceleration values determined in the past, other types of mean values, a statistically calculated value, a value determined by learning or the like. A display means for displaying the result of the misfire decision may be provided. Further, the detection interval for the misfire decision may be set in terms of a predetermined temporal period. Although the invention has been described in conjunction with a four-cylinder engine, it goes without saying that the invention can equally be applied to other engine having a different number of cylinders.

Accordingly, all suitable modifications and equivalents may be resorted to, falling within the spirit and scope of the invention.

We claim:

1. A misfire detecting apparatus for a multi-cylinder internal combustion engine having a plurality of cylinders, comprising:

crank angle detecting means coupled to said engine for detecting first and second predetermined angular intervals set, respectively, before and after a predetermined reference crank angle for each of said cylinders;

acceleration detecting means connected to the output of said crank angle detecting means for determining an acceleration based on a time ratio between times taken for a crank shaft of said engine to rotate through said first and second predetermined angular intervals, respectively, On the basis of an output signal of said crank angle detecting means;

intermittent misfire occurrence detecting means connected to said acceleration detecting means for detecting misfire occurring intermittently in the engine cylinder on the basis of the output signal of said acceleration detecting means; and successive misfire occurrence detecting means for detecting misfire occurring successively in the engine cylinders on the basis of the output signal of said acceleration detecting means, wherein said successive misfire occurrence detecting means counts a number of times magnitude of change in said acceleration exceeds a predetermined value during a predetermined interval and decides successive occurrence of misfire in the cylinder for which said change of acceleration is detected, when said number of times exceeds a second predetermined value.

2. A misfire detecting apparatus according to claim 1, wherein said predetermined reference crank angle is selected close to a top dead center preceding to an explosion stroke in the cylinder.

3. A misfire detecting apparatus according to claim 1, wherein said acceleration is given by $$\beta = TL_i/(T_{i-1})^3 \times (TU_i/TL_i - TU_{i-1}/TL_{i-1})$$

where $\beta$ represents said acceleration, TU represents a temporal duration of said first predetermined angular interval, TL represents a temporal duration of said second predetermined angular interval, T represents a sum of TU and TL, and suffixes i and i−1 represent current and preceding cycles, respectively.

4. A misfire detecting apparatus according to claim 1, wherein said intermittent misfire occurrence detecting means decides whether magnitude of change in said acceleration exceeds a predetermined value and decides occurrence of misfire in the cylinder for which said change of acceleration is detected when said magnitude of change exceeds said predetermined value.

5. A misfire detecting apparatus according to claim 4, wherein said predetermined value is determined as a function of parameters indicating operation state of said engine.

6. A misfire detecting apparatus according to claim 4, wherein said predetermined value is determined as a function of a mean value obtained by averaging the accelerations detected a number of times in the past.

7. A misfire detecting apparatus according to claim 1, wherein said predetermined value is determined as a function of parameters indicating operation state of said engine.

8. A misfire detecting apparatus according to claim 1, wherein said predetermined value is determined as a function of a mean value obtained by averaging the accelerations detected a number of times in the past.

9. A misfire detecting apparatus according to claim 1, wherein said intermittent misfire occurrence detecting means includes comparison means for determining difference in the acceleration between the adjacent cylinders and comparing said difference with a predetermined reference value to thereby decide occurrence of misfire in the cylinder for which greater acceleration is detected, when said difference exceeds a predetermined value.

10. A misfire detecting apparatus according to claim 1, wherein said successive misfire occurrence detecting means includes comparison means for determining difference in the acceleration between the adjacent cylinders and comparing said difference with a predetermined reference value to thereby decide occurrence of misfire in the cylinder for which greater acceleration is detected, when said difference exceeds a predetermined value.

11. A misfire detecting apparatus according to claim 1, wherein a predetermined detection interval is provided for said intermittent misfire occurrence detecting means and said successive misfire occurrence detecting means, and decision is made that misfire has occurred when a misfire event which exceeds a predetermined misfire decision reference value is detected during said predetermined detection interval.

12. A misfire detecting apparatus according to claim 11, wherein said predetermined misfire decision reference value is given by a predetermined ratio at which the misfire is allowed to occur during said detection interval.

13. A misfire detecting apparatus according to claim 12, wherein said ratio is not smaller than 2%.

14. A misfire detecting apparatus for a multi-cylinder internal combustion engine having a plurality of cylinders, comprising:

crank angle detecting means coupled to said engine for detecting first and second predetermined angular intervals set, respectively, before and after a predetermined reference crank angle for each of said cylinders;

acceleration detecting means connected to the output of said crank angle detecting means for determining an acceleration based on a time ratio between times taken for said engine to rotate through said first and second predetermined angular intervals, respectively, on the basis of an output signal of said crank angle detecting means;

intermittent misfire occurrence detecting means connected to said acceleration detecting means for detecting misfire occurring intermittently in the engine cylinder on the basis of the output signal of said acceleration detecting means for thereby outputting a misfire detection signal;

successive misfire occurrence detecting means for detecting misfire occurring successively in the engine cylinders on the basis of the output signal of said acceleration detecting means for thereby outputting a misfire detection signal; and misfire decision means connected to said intermittent misfire occurrence detecting means and said successive misfire occurrence detecting means for counting said misfire detection signals for said cylinders, respectively, which are detected, respectively, during a predetermined detection interval, to thereby determine intermittent or successive misfire occurrence in a given one of said cylinders when said counted value for said given cylinder exceeds a predetermined misfire decision reference value.

15. A misfire detecting apparatus according to claim 14, wherein said misfire decision means invalidates said misfire decision in said predetermined detection interval when said counted value for at least other one of said cylinders exceed said predetermined misfire decision reference value.

16. A misfire detecting apparatus according to claim 14, wherein said predetermined reference crank angle is selected close to a top dead center preceding to an explosion stroke in the cylinder.

17. A misfire detecting apparatus according to claim 14, wherein said acceleration is given by $$\beta = TL_i/(T_{i-1})^3 \times (TU_i/TL_i - TU_{i-1}/TL_{i-1})$$

where $\beta$ represents said acceleration, TU represents a temporal duration of said first predetermined angular interval, TL represents a temporal duration of said second predetermined angular interval, T represents a sum of TU and TL, and suffixes i and i−1 represent current and preceding cycles, respectively.

18. A misfire detecting apparatus according to claim 14, wherein both of said misfire occurrence detecting means decide whether magnitude of change in said acceleration exceeds a predetermined value and decide occurrence of misfire in the cylinder for which said change of acceleration is detected when said magnitude of change exceeds said predetermined value.

19. A misfire detecting apparatus according to claim 18, wherein said predetermined value is determined as a function of parameters indicating operation state of said engine.

20. A misfire detecting apparatus according to claim 18, wherein said predetermined value is determined as a function of a mean value obtained by averaging the accelerations detected a number of times in the past.

21. A misfire detecting apparatus according to claim 14, wherein both of said misfire occurrence detecting means include comparison means for determining difference in the acceleration between the adjacent cylinders and comparing said difference with a predetermined reference value to thereby decide occurrence of misfire in the cylinder for which greater acceleration is detected, when said difference exceeds a predetermined value.

22. A misfire detecting apparatus for a multi-cylinder internal combustion engine having a plurality of cylinders, comprising:

crank angle detecting means coupled to said engine for detecting first and second predetermined angular intervals, respectively, set before and after a predetermined reference angular position for each of said cylinders;

load detecting means coupled to said interval combustion engine for detecting a load of the engine;

acceleration detecting means connected to said crank angle detecting means for detecting an acceleration based on a time ratio between the times taken for a crank shaft of said engine to rotate through said first and second predetermined angular intervals, respectively, on the basis of the output signal of said crank angle detecting means;

engine rotation speed detecting means connected to said crank angle detecting means for detecting rotation speed of said internal combustion engine on the basis of the output signal of said crank angle detecting means;

intermittent misfire occurrence detecting means connected to said load detecting means, said acceleration detecting means and said engine rotation speed detecting means for detecting intermittent misfire occurrence in each cylinder of said engine on the basis of the output signal of said acceleration detecting means through comparison with a misfire decision reference value;

successive misfire occurrence detecting means connected to said detecting means connected to said acceleration detecting means and said engine speed detecting means for detecting misfire occurring successively in each cylinders of said engine on the basis of the output signal of said acceleration detecting means through comparison with a misfire decision reference value;

wherein said intermittent misfire occurrence detecting means and said successive misfire occurrence detecting means are adapted to change said misfire decision reference value in dependence on the output signal of said load detecting means, and wherein said successive misfire occurrence detecting means counts a number of times magnitude of change in said acceleration exceeds a predetermined value during a predetermined interval and decides successive occurrence of misfire in the cylinder for which said change of acceleration is detected, when said number of times exceeds a second predetermined value.

23. A misfire detecting apparatus according to claim 22, wherein said intermittent misfire occurrence detecting means and said successive misfire occurrence detecting means are adapted to change said misfire decision reference value in dependence on the output signal of said engine rotation speed detecting means.

24. A misfire detecting apparatus according to claim 22, wherein said intermittent misfire occurrence detecting means and said successive misfire occurrence detecting means are designed to invalidate the misfire decision when at least one of the output signals of said load detecting means and said engine speed detecting means satisfies predetermined condition.

25. A misfire detecting apparatus according to claim 22, wherein said predetermined condition is given as a function of at least one of an engine intake air quantity and an engine rotation speed.

26. A misfire detecting apparatus according to claim 25, wherein said predetermined condition is that said engine rotation speed is in a range lower than 1000 rpm.

27. A misfire detecting apparatus according to claim 22, wherein said predetermined reference crank angle is selected close to a top dead center preceding to an explosion stroke in the cylinder.

28. A misfire detecting apparatus according to claim 22, wherein said acceleration is given by $$\beta = TL_i/(T_{i-1})^3 \times (TU_i/TL_i - TU_{i-1}/TL_{i-1})$$

where $\beta$ represents said acceleration, TU represents a temporal duration of said first predetermined angular interval, TL represents a temporal duration of said second predetermined angular interval, T represents a sum of TU and TL, and suffixes i and i–1 represent current and preceding cycles, respectively.

29. A misfire detecting apparatus according to claim 22, wherein both of said misfire occurrence detecting means decide whether magnitude of change in said acceleration exceeds a predetermined value and decide occurrence of misfire in the cylinder for which said change of acceleration is detected when said magnitude of change exceeds said predetermined value.

30. A misfire detecting apparatus according to claim 29, wherein said predetermined value is determined as a function of parameters indicating operation state of said engine.

31. A misfire detecting apparatus according to claim 29, wherein said predetermined value is determined as a function of a mean value obtained by averaging the accelerations detected a number of times in the past.

32. A misfire detecting apparatus according to claim 22, wherein both of said misfire occurrence detecting means include comparison means for determining difference in the acceleration between the adjacent cylinders and comparing said difference with a predetermined reference value to thereby decide occurrence of misfire in the cylinder for which greater acceleration is detected, when said difference exceeds a predetermined value.

33. A misfire detecting apparatus for a multi-cylinder internal combustion engine having a plurality of cylinders, comprising:

crank angle detecting means Coupled to said engine for detecting first and second predetermined angular intervals set, respectively, before and after a predetermined reference crank angle for each of said cylinders;

acceleration detecting means connected to the output of said crank angle detecting means for determining an acceleration based on a time ratio between times taken for a crank shaft of said engine to rotate through said first and second predetermined angular intervals, respectively, on the basis of an output signal of said crank angle detecting means;

intermittent misfire occurrence detecting means connected to said acceleration detecting means for detecting misfire occurring intermittently in the engine cylinder on the basis of the output signal of said acceleration detecting means; and successive misfire occurrence detecting means for detecting misfire occurring successively in the engine cylinders on the basis of the output signal of said acceleration detecting means, wherein said successive misfire occurrence detecting means determines occurrence of an intermittent misfire when a deviation between the present acceleration and the immediately preceding acceleration is greater than a predetermined value, and it determines a successive misfire when deviations between the present acceleration and preceding two accelerations for the same cylinder are respectively greater than said predetermined value.

34. A misfire detecting apparatus for a multi-cylinder internal combustion engine having a plurality of cylinders, comprising:

crank angle detecting means coupled to said engine for detecting first and second predetermined angular intervals set, respectively, before and after a predetermined reference crank angle for each of said cylinders;

acceleration detecting means connected to the output of said crank angle detecting means for determining an acceleration based on a time ratio between times taken for said engine to rotate through said first and second predetermined angular intervals, respectively, on the basis of an output signal of said crank angle detecting means;

intermittent misfire occurrence detecting means connected to said acceleration detecting means for detecting misfire occurring intermittently in the engine cylinder on the basis of the output signal of said acceleration detecting means for thereby outputting a misfire detection signal;

successive misfire occurrence detecting means for detecting misfire occurring successively in the engine cylinders on the basis of the output signal of said acceleration detecting means for thereby outputting a misfire detection signal; and misfire decision means connected to said intermittent misfire occurrence detecting means and said successive misfire occurrence detecting means for counting said misfire detection signals for said cylinders, respectively, which are detected, respectively, during a predetermined detection interval, to thereby determine intermittent or successive misfire occurrence in a given one of said cylinders when said counted value for said given cylinder exceeds a predetermined misfire decision reference value, wherein said successive misfire occurrence detecting means determines occurrence of an intermittent misfire when a deviation between the present acceleration and the immediately preceding acceleration is greater than a predetermined value, and it determines a successive misfire when deviations between the present acceleration and preceding two accelerations for the same cylinder are respectively greater than said predetermined value.

35. A misfire detecting apparatus for a multi-cylinder internal combustion engine having a plurality of cylinders, comprising:

crank angle detecting means coupled to said engine for detecting first and second predetermined angular intervals, respectively, set before and after a predetermined reference angular position for each of said cylinders;

load detecting means coupled to said interval combustion engine for detecting a load of the engine;

acceleration detecting means connected to said crank angle detecting means for detecting an acceleration based on a time ratio between the times taken for a crank shaft of said engine to rotate through said first and second predetermined angular intervals, respectively, on the basis of the output signal of said crank angle detecting means;

engine rotation speed detecting means connected to said crank angle detecting means for detecting rotation speed of said internal combustion engine on the basis of the output signal of said crank angle detecting means;

intermittent misfire occurrence detecting means connected to said load detecting means, said acceleration detecting means and said engine rotation speed detecting means for detecting intermittent misfire occurrence in each cylinder of said engine on the basis of the output signal of said acceleration detecting means through comparison with a misfire decision reference value; and successive misfire occurrence detecting means connected to said detecting means connected to said acceleration detecting means and said engine speed detecting means for detecting misfire occurring successively in each cylinders of said engine on the basis of the output signal of said acceleration detecting means through comparison with a misfire decision reference value;

wherein said intermittent misfire occurrence detecting means and said successive misfire occurrence detecting means are adapted to change said misfire decision reference value in dependence on the output signal of said load detecting means, and wherein said successive misfire occurrence detecting means determines occurrence of an intermittent misfire when a deviation between the present acceleration and the immediately preceding acceleration is greater than a predetermined value, and it determines a successive misfire when deviations between the present acceleration and preceding two accelerations for the same cylinder are respectively greater than said predetermined value.

* * * * *